United States Patent
Hans

(10) Patent No.: US 9,220,002 B2
(45) Date of Patent: Dec. 22, 2015

(54) APPARATUS AND METHODS FOR TRANSMISSION OF EMERGENCY CALL DATA OVER WIRELESS NETWORKS

(75) Inventor: Martin Hans, Bad Salzdetfurth (DE)

(73) Assignee: APPLE INC., Cupertino, CA (US)

( * ) Notice: Subject to any disclaimer, the term of this patent is extended or adjusted under 35 U.S.C. 154(b) by 257 days.

(21) Appl. No.: 13/609,095

(22) Filed: Sep. 10, 2012

(65) Prior Publication Data

US 2013/0003611 A1 Jan. 3, 2013

Related U.S. Application Data

(63) Continuation of application No. 12/368,947, filed on Feb. 10, 2009, now Pat. No. 8,265,022.

(51) Int. Cl.

| | |
|---|---|
| *H04L 12/66* | (2006.01) |
| *H04W 4/00* | (2009.01) |
| *H04W 4/22* | (2009.01) |
| *H04M 3/51* | (2006.01) |
| *H04W 76/00* | (2009.01) |
| *H04L 29/06* | (2006.01) |
| *H04W 24/04* | (2009.01) |

(Continued)

(52) U.S. Cl.
CPC .............. *H04W 4/22* (2013.01); *H04L 65/1069* (2013.01); *H04L 65/4007* (2013.01); *H04L 65/602* (2013.01); *H04L 65/608* (2013.01); *H04M 3/5116* (2013.01); *H04W 24/04* (2013.01); *H04W 40/02* (2013.01); *H04W 76/007* (2013.01); *H04M 2207/18* (2013.01); *H04M 2242/04* (2013.01); *H04W 76/025* (2013.01)

(58) Field of Classification Search
None
See application file for complete search history.

(56) References Cited

U.S. PATENT DOCUMENTS

| | | | |
|---|---|---|---|
| 2003/0142662 A1 | 7/2003 | Mahajan | |
| 2004/0125764 A1* | 7/2004 | Piwowarski et al. | 370/328 |
| 2004/0185840 A1 | 9/2004 | Sumino et al. | |

(Continued)

FOREIGN PATENT DOCUMENTS

| | | |
|---|---|---|
| JP | H11-511313 | 9/1999 |
| JP | 2002-291022 A | 10/2002 |

(Continued)

OTHER PUBLICATIONS

Options for eCall MSD signaling, [online], GSME Position, Belfium, GSM Europe, Apr. 21, 2006, [searched on Mar. 13, 2013], p. 2, 4-6, 11, Internet,URL:http://www.esafetysupport.prg/download/ecall_toolbox/Reports/Appendix_12.pdf>.

(Continued)

*Primary Examiner* — Chi H Pham
*Assistant Examiner* — Soon-Dong D Hyun
(74) *Attorney, Agent, or Firm* — Fay Kaplun & Marcin, LLP

(57) ABSTRACT

Methods and apparatus for providing useful data in association with a high-priority call such as an emergency call. In one embodiment, the data comprises a data (e.g., an MSD or FSD) embedded within one or more real-time protocol packets such as RTP Control Protocol (RTCP) packets, that are interspersed within the voice or user data stream (carried in e.g., RTP packets) of an emergency call. Apparatus and methods are described for transmitting the data portion reliably from the initiating terminal (e.g., an in-vehicle system) to a Public Safety Answering Point (PSAP), by using the same transport connection as the user data.

17 Claims, 10 Drawing Sheets

(51) Int. Cl.
*H04W 40/02* (2009.01)
*H04W 76/02* (2009.01)

(56) References Cited

U.S. PATENT DOCUMENTS

| | | | |
|---|---|---|---|
| 2004/0214555 A1 | 10/2004 | Kumar et al. | |
| 2007/0003024 A1* | 1/2007 | Olivier et al. | 379/45 |
| 2007/0136793 A1 | 6/2007 | Da Palma et al. | |
| 2007/0189246 A1 | 8/2007 | Molnar | |
| 2008/0069084 A1 | 3/2008 | Den Hartog et al. | |
| 2008/0228393 A1 | 9/2008 | Geelen et al. | |
| 2008/0253321 A1* | 10/2008 | Gormley et al. | 370/329 |
| 2008/0261557 A1* | 10/2008 | Sim | 455/404.2 |
| 2009/0311988 A1 | 12/2009 | Johannesson et al. | |
| 2010/0029280 A1* | 2/2010 | Tenny et al. | 455/436 |
| 2010/0054209 A1 | 3/2010 | Mahdi | |
| 2010/0057485 A1 | 3/2010 | Luft | |
| 2010/0081451 A1 | 4/2010 | Mueck | |
| 2010/0134590 A1* | 6/2010 | Lindstrom et al. | 348/14.11 |
| 2010/0302022 A1 | 12/2010 | Saban | |
| 2012/0135704 A1* | 5/2012 | Gunasekara | 455/404.2 |

FOREIGN PATENT DOCUMENTS

| | | |
|---|---|---|
| JP | 2003-037623 A | 2/2003 |
| JP | 2003-179580 | 6/2003 |
| JP | 2003-298677 A | 10/2003 |
| JP | 2006-180515 A | 7/2006 |
| JP | 2007-235753 | 9/2007 |
| JP | 2008-048335 A | 2/2008 |
| WO | 97/07606 | 2/1997 |
| WO | 2006/103374 | 10/2006 |
| WO | WO 2006103374 | 10/2006 |

OTHER PUBLICATIONS

G Hellstrom, Omnitor AB; P, Jones, Cisco Systems, Inc.; Jan. 2006; Real-Time Transport Protocol (RTP) Payload for Text Conversation Interleaved in a Audio Stream; RFC 4351, 20 pages.

B. Rosen, NeuStar Inc.; H. Tschofenig, Nokia Siemens Netvvorks; U. Dietz, Vodafone Jul. 12, 2008; Best Current Practice for IP-based In-Vehicle Emergency Calls; draft-rosen-ecrit-ecall-01.txt, 18 pages.

GSME Position; Options for eCall MSD signaling, Apr. 21, 2006; 22 pages.

XP-002573844; 3GPP TS 26.267, V1.0.0 (Sep. 2008) Technical Specification; 3.sup.rd Generation Partnership Project; Technical Specification Group Services and System Aspects; eCall Data Transfer; In-band modem solution; General description (Release 8); GSM, Global System for Mobile Communications 3GPP, 28 pages.

R. Stewart, ED; Sep. 2007; Stream Control Transmission Protocol: RFC 4960, 150 pages.

H. Schulzrinne, Columbia U.; A. Rao; Netscape; R. Lanphier; Real Networks; Apr. 1998, Real Time Streaming Protocol (RTSP); RFC 2326, 92 pages.

H. Scholzrinne; Columbia U.; J. Polk; Cisco Systems; Feb. 2006; Communications Resource Priority for the Session Initiation Protocol (SIP); RFC 4412, 33 pages.

P. Zimmermann, Zfone Project; A. Johnston, ED.; Avaya; J. Callas; PGP Corporation; Oct. 25, 2008; ZRPT: Media Path Key Agreement for source RTP draft-zimmermann-avt-zrpt-10; 90 pages.

M.Baugher; D. McGrew, Cisco Systems, Inc.; M. Naslund; E. Carrara; K. Norrman; Ericsson Research; Mar. 2004; RFC 3711; 56 pages.

H. Schulzrinne; Columbia University; S. Casner; Packet Design; R. Frederick: Blue Coat Systems Inc.; V. Jacobson; Packet Design; Jul. 2003; RFC 3550 104 pages.

* cited by examiner

| Byte No. | Name | Size | Type | Unit | | Description |
|---|---|---|---|---|---|---|
| 1 | Control | 1 Byte | Integer | | M | Bit 7:1= Automatic activation<br>Bit 6:1= Manual activation<br>Bit 5:1= Test Call<br>Bit 4:1= No Confidence in position<br>Bit 3:<br>Bit 2:<br>Bit 1:<br>Bit 0: |
| 2 | Vehicle identification | 20 Bytes | String | | M | VIN number according ISO 3779 |
| 3 | Time stamp | 4 Bytes | Integer | UTC sec | M | Timestamp of incident event |
| 4 | Location | 4 Bytes | Integer | milliarcsec | M | GNSS Position Latitude (WGS84) |
| | | 4 Bytes | Integer | milliarcsec | M | GNSS Position Longitude (WGS84) |
| | | 1 Byte | Integer | Degree | M | Direction of Travel |
| 5 | Service Provider | 4 Bytes | Integer | IPV4 | O | Service Provider IP Address |
| 6 | Optional Data | 106 Bytes | String | tbd | O | Further data encoded in XML Format |
| | Sum: | 140 Bytes | | | | |

M – Mandatory data field
O – Optional data field (default blank characters)

FIG. 1
(PRIOR ART)

APPARATUS AND METHODS FOR TRANSMISSION OF EMERGENCY CALL DATA OVER WIRELESS NETWORKS

PRIORITY

This application is a continuation of and claims priority to co-owned U.S. patent application Ser. No. 12/368,947 filed Feb. 10, 2009 and entitled "APPARATUS AND METHODS FOR TRANSMISSION OF EMERGENCY CALL DATA OVER WIRELESS NETWORKS", (issuing as U.S. Pat. No. 8,265,022), which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication systems. More particularly, in one exemplary aspect, the present invention is directed to the transmission of emergency or similar call data within a wireless network.

2. Description of Related Technology

Digital wireless systems such as e.g., cellular mobile communication systems, offer both real-time and non-real-time services to a user. Examples of real-time services include for example voice telephony calls and video telephony calls, while non-real-time services include various types of messaging services (e.g. SMS, MMS, e-mail) or presence services (e.g., "chat"). Digital cellular mobile communication can be realized either in a circuit switched network architecture (CS domain), or in a packet switched network architecture (PS domain). CS domain calls require a "circuit" or continuous connection to be created before a user data exchange can occur; e.g., to exchange digital voice data. Circuit switched networks connect one terminal through the mobile cellular network(s) and the CS domain core (backbone) network to another terminal. The connection establishment is performed between the involved network elements via various known control protocols. Once the connection is established, the digital user data transmitted by one terminal to the cellular mobile network is transported along the connection route through the network to the other terminal. Circuit Switched paths remain unchanged for the duration of the connection; no modifications can be made mid-call to alter the routing of the call.

PS domain calls (such as e.g., VoIP calls) do not have "hard connectivity" like CS domain calls. Instead, PS domain calls are routed flexibly on a network level; the underlying transport route is not pre-defined and may dynamically change. PS domain calls are packetized and transferred piecemeal through a "cloud" of network elements; therefore, every data packet comprises a routable Network Address (e.g. Internet Protocol or IP address) of both the source and destination terminals. A typical implementation of a packet switched network may embed Internet Protocol (IP) routing information within each transmitted data packet. This routing is commonly referred to as IP-routing. From a network level, IP-routing is connection-less; however, PS-domain calls may need (and typically perform) connection establishment on an application/session layer before data transfer to negotiate various parameters such as type, quality, format, coding of the exchanged data and/or quality, bandwidth as well as other parameters of the underlying transport streams.

CS and PS domains have several distinct differences directly related to their structure and method of operation. As noted above, CS domain calls maintain a "fixed" circuit throughout operation; therefore, a CS call has a reasonably consistent timing (because the data transmission follows the same route with fixed transmission parameters) for its data transmissions within certain tolerances. Furthermore, a CS call is naturally linear; each transmission sequentially follows its predecessor. A PS domain call differs significantly from the CS domain model due to the flexible routing of the packets to their destination, irregular bandwidth or capacity, and varying delay of the set of hops the data is routed along. Thus the timing and delay associated with the data packets varies over a wide range for a PS call. Accordingly, data packets that carry real-time data such as voice or video data are normally embedded in a protocol that enables the extraction of timing information.

For instance, the commonly used Real Time Transport Protocol (RTP) contains, inter alia, such timing information and is commonly used for real time voice and video data transmission within PS domains of a cellular mobile network. Both the RTP and RTCP are intended for use within systems that handle broader transport layer requirements, such as addressing, error detection and/or error correction mechanisms. The most commonly used protocols into which RTP and RTCP packets are embedded are the User Datagram Protocol (UDP) and the Transport Control Protocol (TCP). Among other differences, TCP offers reliable transport and QoS (quality of service) with error correction mechanisms, whereas UDP does not offer such guarantees. The additional functionality of TCP requires more messaging overhead, as well as "state memory" within network components. UDP is simpler and more efficient, but can be lossy and irregular depending on its bearer. UDP does not require any handshaking to transmit or receive a segment, thus UDP may also be generally categorized as "connectionless". RTP is typically used in combination with UDP, as the two protocols have complementary features. In most use cases, the additional reliability of TCP would be wasted on RTP; the additional time required to ensure accurate delivery would negate any benefits of error correction (late packets are discarded in most RTP systems).

Emergency and Other High Priority Calls

Normal services in cellular mobile networks (such as a voice call) are established only under certain acceptance preconditions. These pre-conditions may include: authentication of the user (as to identity), authorization of the user for particular services, checking the user's account status, and the ability or willingness of the operator to grant the required resources to the user. Depending upon the conditions present within the network, as well as the status of a mobile terminal with regards to pre-conditions (e.g. authentication, authorization, and accounting), call establishment times may be delayed or the call may be rejected altogether. In the case of a high priority call (e.g., an emergency call placed to request emergency services assistance, such as fire, medical emergency or police), the emergency call may be given a higher priority handling to prevent any delay or hindrance.

An emergency call may either be requested or detected; either the terminal indicates in the call establishment request that it wants to establish an emergency call, or alternatively the network may determine that the destination address is a request for emergency services (e.g. by a user dialing 911, etc.). In either situation, after having received the request to setup an emergency call, the network treats the request with high priority, and expedites processing. In addition to establishing the emergency call, it is possible that the network may initiate other procedures to provide the termination point with additional information about the originator of the emergency call (such as geographical location, etc.). Many cellular networks have defined "Emergency Calls" that can be established with a minimum set of pre-conditions (e.g. by obviating the need for the user to be authenticated, etc.).

ECalls and Enhanced 911 (E911)

According to various guidance from relevant standards bodies and government authorities, another class of emergency communications comprises so-called "eCalls" (Europe) or Enhanced 911 calls (North America), the latter which further includes Wireless E911 and VoIP E911. See, e.g., the European Commission Memorandum of Understanding entitled "Memorandum of Understanding for Realisation of Interoperable In-Vehicle eCall", eSafety Forum and eCall Driving Group, dated May 28, 2004 and related implementation standards, incorporated herein by reference in its entirety, which describe European eCall systems.

For example, under the aforementioned European system, an eCall is an emergency call from an In-Vehicle System (IVS) generated either manually by the occupants of the vehicle, or automatically by the IVS, after the detection of an event such as an automobile accident. The eCall is sent from the IVS, across a $2^{nd}$ Generation (2G) or $3^{rd}$ Generation (3G) mobile network, to a Public Safety Answering Point (PSAP). Together with the emergency call, a Minimum Set of Data (MSD) is transmitted to the PSAP that describes the relevant situation; e.g., information automatically generated by or derived from the automobile. Information given in the MSD may comprise a high-accuracy location of the car (typically measured with a built-in Global Navigation Satellite System (GNSS) transceiver), the number of occupants, whether or not the car has turned over as a result of the accident, etc. Note that prior art implementations of the initial eCall or E911 service operate in the CS domain.

The format of the exemplary MSD is illustrated in FIG. 1. As can be seen, the size of the MSD 100 may vary as a portion of the information elements within the MSD are optional. Specifically, the content of the Optional Data field 102 is only required to be Extensible Markup Language (XML) code; the length of the field is allowed to vary within a prescribed range. However, the maximum data size for the MSD 100 is one-hundred forty (140) bytes.

Another alternative to the MSD is a Full Set of Data (FSD) that may be sent if the underlying transport mechanisms allow a larger size of eCall data to be transmitted. Hence, as used herein, the term "eCall data" refers to an MSD, FSD or any other data that is transmitted (which may be in concert with the voice data) within an eCall connection.

Several potential options exist for the transmission of data (such as for example MSD or FSD). These options include: (i) Short Message Service (SMS); (ii) User to User Signaling (UUS); (iii) Unstructured Supplementary Service Data (USSD); (iv) Global Systems for Mobile communications (GSM) CS Data; (v) Dual-Tone Multi-Frequency (DTMF); and (vi) In-band modem/Signaling Application. However, these solutions fail to provide adequate capability to transport a minimum set of data in combination with an emergency call in a timely fashion, and without redirection or rerouting on a packet switched network. Consequently, improved apparatus and methods are needed which would address these deficiencies.

SUMMARY OF THE INVENTION

The present invention satisfies the aforementioned needs by providing improved apparatus and methods for the transmission of emergency or similar call data within a wireless (e.g., cellular) communications network.

In a first aspect of the invention, a method of providing an emergency call within a network adapted for packet-switched operation is disclosed. In one embodiment, the network provides substantially real-time packet-switched operation, and the emergency call includes a composite stream having a first stream and one or more second streams. The first stream is provided in a substantially continuous manner, and the composite stream is formed using at least the first stream and the one or more second streams. A session is established; the session is adapted to route the composite stream, the latter which is transmitted via the session.

In one variant, the session comprises a real-time session established utilizing a session initiation protocol.

In another variant, the first stream includes of a plurality of voice packets, and the one or more second streams includes a plurality of data packets. The substantially continuous stream is provided by substantially continuously encoding a voice signal to produce the voice packets.

In still another variant, the provision of the one or more second streams is performed in a substantially discontinuous or non-constant manner, this substantially discontinuous manner providing data from at least one source only periodically or intermittently.

In yet another variant, the composite stream, the first stream and the one or more second streams are packetized, and the composite stream is formed by interspersing one or more packets of the first stream with one or more packets of the second stream.

In still another variant, interspersing is performed using a multiplexing algorithm.

In still yet another variant, the forming the composite stream using at least the first stream and the one or more second streams is accomplished by disposing at least portions of the first stream in a plurality of RTP packets, disposing at least portions of the one or more second streams in a plurality of RTCP packets, and interspersing the RTP packets with the RTCP packets.

In another variant, the network includes a 3GPP IMS-compliant cellular network, and the session is established utilizing the Session Initiation Protocol (SIP).

In a second aspect of the invention, an apparatus for making an emergency call within a network capable of packet-switched operation is disclosed. In one embodiment, the apparatus includes a microphone (adapted to continuously capture and digitally analyze voice into a plurality of first packets), one or more sensors adapted to encode one or more parameters associated with the apparatus or a platform on which the apparatus is carried into one or more second packets, a radio transmitter adapted to transmit a plurality of packets across a wireless network, a processor in data communication with the transmitter, and a computer-readable apparatus comprising media adapted to contain a computer program having a plurality of instructions. The plurality of instructions, when executed by the processor, generate the plurality of packets for transmission at least in part from an interspersing of the plurality of first packets with the one or more second packets. The instructions also establish a session adapted to route the interspersed plurality of first packets and one or more second packets without storage, and transmit the interspersed plurality of packets via the radio transmitter.

In one variant, the generation of the plurality of packets for transmission includes generating a plurality of third packets, the third packets being derived from the interspersed plurality of first packets and one or more second packets.

In another variant, the apparatus additionally includes a radio receiver adapted to receive a plurality of packets from the wireless network, and a speaker adapted to digitally synthesize voice from the received plurality of packets.

In still another variant, the apparatus additionally includes a speaker subsystem, receiver apparatus adapted to receive a plurality of packets from the wireless network, and separation apparatus adapted to separate the plurality of packets received from the network into a voice component and a data component. The separation apparatus is adapted to provide the voice component to the speaker subsystem, determine from the data component a status of receipt of the one or more second packets.

In yet another variant, the apparatus is housed substantially within a vehicle adapted to transport one or more occupants.

In still another variant, the apparatus includes a satellite-based position determination receiver (e.g., GPS receiver). The one or more sensors may include: (i) an accelerometer adapted to detect a collision; (ii) an accelerometer adapted to detect the vehicle overturning; and/or (iii) a sensor adapted to determine the vehicle occupancy.

In another variant, the wireless network is a cellular network compliant with 3GPP IP Multimedia Core Network Sub-System (IMS) requirements, and the session is established using the Session Initiation Protocol (SIP).

In yet another variant, the interspersing of the plurality of first packets with the one or more second packets comprises interspersing a plurality of RTP packets with one or more RTCP packets, the one or more RTCP packets comprising a Minimum Set of Data (MSD).

In a third aspect of the invention, a network apparatus configured to receive an emergency call within a packet switched network is disclosed. In one embodiment, the apparatus includes a network interface adapted to receive first and second pluralities of packets via an internet protocol (IP) network in data communication with the apparatus, a processor in data communication with the interface, and a computer readable apparatus comprising media adapted to contain a computer program having a plurality of instructions. When executed by the processor, these instructions receive a request for a communication session (the session being adapted facilitate to transfer the first and second pluralities of packets), establish the session, receive the first and second pluralities of packets via the session, extract substantially real-time user data from the first plurality of packets, and extract emergency-related data from the second plurality of packets.

In one variant, the network apparatus further includes an audio module having a speaker and adapted to play out audio via the speaker, the audio being derived from the extracted substantially real-time user data.

In another variant, the packet-switched network includes a 3GPP IP Multimedia Core Network Sub-System (IMS), and the session is established using at least the Session Initiation Protocol (SIP).

In another variant, the first and second pluralities of packets are interspersed RTP packets and RTCP packets, respectively.

In still another variant, at least a portion of the RTCP packets include a Minimum Set of Data (MSD). In yet another variant, the emergency-related data includes the Minimum Set of Data (MSD).

In still yet another variant, the network apparatus is part of a Public Safety Answering Point (PSAP).

In a fourth aspect of the invention a method of placing a high-priority call within a network capable of packet-switched operation is disclosed. In one embodiment, the method includes providing a substantially continuous user data stream and a plurality of data related to a high-priority event. At least portions of the user data stream are disposed within a first packetized protocol structure, and at least portions of the data related to the high-priority event are placed within a second packetized protocol structure. The first and second protocol structures are interspersed, and the composite stream is transmitted over the network via a communications session.

In one variant, the high-priority call is an emergency call, and the data related to a high-priority event includes a Minimum Set of Data (MSD).

In another variant, the network is a 3G cellular network, and the transmission is performed by first establishing at least one session via a session establishment protocol.

In another variant, the first packetized protocol is a real-time transport protocol, and the second packetized protocol comprises a real-time control protocol.

In still another variant, the method is initiated substantially automatically by a transmission apparatus disposed substantially within a land vehicle pursuant to the event. This event may include for example (i) a vehicle collision; (ii) a vehicle roll-over; and/or (iii) a vehicle fire.

In yet another variant, the user data includes both video and voice data.

In still yet another variant, the data related to a high-priority event includes substantially accurate location data for the first entity at the time of the call, the accurate location data not being solely based on a network address.

In a fifth aspect of the invention, a telecommunications apparatus adapted for the conveyance of emergency calls is disclosed. In one embodiment, the conveyance uses a reliable packetized protocol transport, and one or more emergency calls are sent to an entity adapted to receive packetized data from a network and process the data. The apparatus includes a radio transmitter and apparatus in communication with the transmitter configured to cause transmission of packetized data over the network. The packetized data includes first packets carrying substantially real-time user data, and second packets interspersed with the first packets and carrying emergency-related data, with the first and second packets formatted according to different protocols. Each of these different protocols support quality-of-service requirements adapted to provide the aforementioned reliable transport.

In one variant, the emergency-related data comprises accurate location data for the telecommunications apparatus at the time of a call (which may or may not be based on a network address).

In a sixth aspect of the invention, a method of routing an emergency call from a source to a destination is disclosed. In one embodiment, the method determines if both circuit-switched and packet-switched network routes are available to route the call; if both the routes are available, at least one of the routes is evaluated against at least one selection criterion. One of the routes is selected based at least in part on this evaluation, and the call is routed over the selected route. If only the packet-switched route is available, the call is routed over the packet-switched route.

In another aspect of the invention, a network controller and associated method for routing emergency data over a multi-mode (e.g., CS- and PS-capable) wireless network is disclosed. In one embodiment, the network controller includes logic adapted to evaluate which of the two options (CS or PS) is optimal based on one or more criteria, and then route the data over that domain. For instance, the CS domain may not be available for technical or other reasons, and accordingly a PS domain eCall would be selected.

In yet another aspect of the invention, a computer readable apparatus having a storage media is disclosed. In certain variants, this apparatus takes the form of a hard disk drive (HDD), CD-ROM, or program or data memory integrated circuit (IC), and stores one or more computer programs which implement various aspects of the functionality described herein.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 1 is a graphical representation of the packet structure associated with a prior art Minimum Set of Data (MSD) Packet.

DETAILED DESCRIPTION OF THE INVENTION

Figure 2:
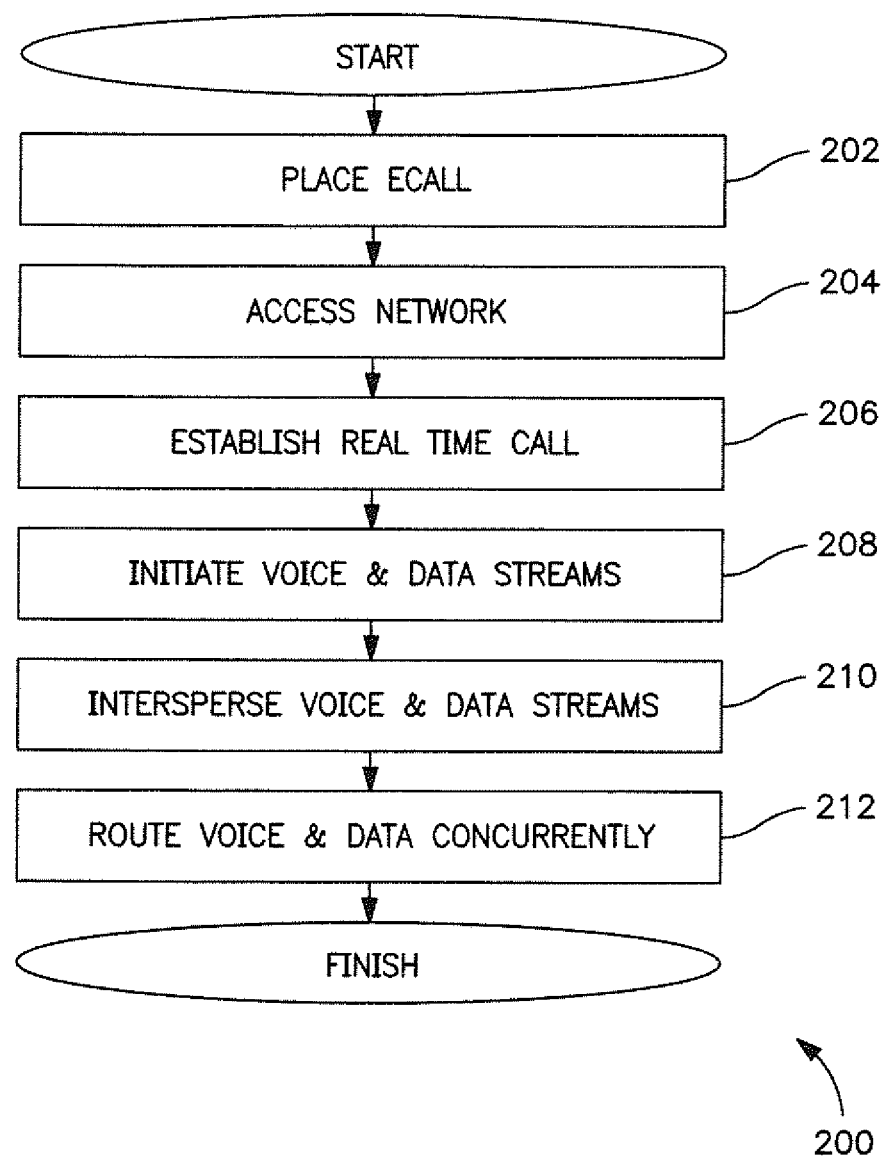
FIG. 2 is a logical flow diagram illustrating one embodiment of the generalized emergency call process for embedding emergency call data within a real time voice call in accordance with the invention.

Reference is now made to the drawings, wherein like numerals refer to like parts throughout.

Overview

The present invention discloses, inter alia, methods and apparatus for providing useful data in association with a high priority call. In one embodiment, the data is a minimum set of data (MSD) embedded within RTP Control Protocol (RTCP) packets comprising the voice data stream of an emergency call (eCall). Apparatus and methods are described for transmitting the MSD data portion reliably from the terminal (IVS) to the Public Safety Answering Point (PSAP), by using the same transport connection as the voice data. Furthermore, the MSD data packets may be modified or altered if desired, but the voice data packets can remain untouched.

In one regard, the invention also advantageously enables current cellular network deployments to naturally evolve from circuit switched (CS) to packet switched (PS) services, without also requiring significant modifications to support emergency services infrastructure. Furthermore, such implementations are suitable for various gradations of systems spanning both CS and PS domains.

In one embodiment, packet switched voice (or other real-time data) connections already utilizing RTP for timing, packaging and other purposes are leveraged. Specifically, RTP packet streams are periodically embedded with packets of the RTP Control Protocol (RTCP); such RTCP packets provide each participant with relevant information about other participants, including parameters such as reception quality, and source descriptions.

In another variant, the benefits of packet switched data transport such as reliable transmission of data, error correction, retransmission, and/or data recovery, are leveraged for usage with MSD data packets. Unlike other methods of packaging data transmissions with voice, which typically concatenate the data stream to either prefix or postfix the voice data stream, an "interspersing" approach is utilized in the context of the RTCP protocol; i.e., the data stream is interspersed within the voice stream, thus enabling features, such as constant updating of MSD, multiple retransmission of MSD, etc., to be realized.

In another aspect, the disclosed apparatus and methods are particularly adapted to operate within the existing framework of the cellular network. In light of limitations imposed by the cellular network, timing constraints for standardized eCall data transmissions must be observed. Advantageously, no modifications to the extant protocol stack are necessary to support various voice coder data and or technologies. While the disclosed invention enables the modification of non-voice data by network components, such modification is not necessary for the correct operation of the system. More importantly however, the voice data remains packetized and can be transmitted without modification, to prevent errors incidental to or caused by transcoding or other such processes.

In yet another advantageous aspect, the routing of data occurs on an end-to-end basis between the relevant entities (e.g., the In Vehicle System (IVS) and the PSAP in the context of an eCall); no additional network components or storage are necessary for data routing. Unlike other methods used for transmitting data (which generally fall in the "store and forward" mode of operation previously described), the data transmitted to supplement an eCall can obey timing requirements, and can be transmitted immediately without being rerouted unnecessarily (e.g., to a home network for the user).

Detailed Description of Exemplary Embodiments

Exemplary embodiments of the present invention are now described in detail. While these embodiments are primarily discussed in the context of communications between an exemplary In Vehicle System ("IVS") and a Public Safety Answering Point ("PSAP"), it is recognized that the principles of the present invention have applicability in systems beyond those of the exemplary IVS and PSAP. For example, current generation User Equipment ("UE"), such as a 3G cellular telephone, is capable of generating the information necessary to effectively communicate eCall data to a receiving device (such as an E911 operator).

Moreover, the present invention is in no way limited to any jurisdiction or system (e.g., eCall versus E911, etc.), and may be employed in literally any such context.

In addition, while primarily discussed in the context of Real-Time Transport Protocol ("RTP") and RTP Control Protocol ("RTCP") (see RFC 3550 entitled "*RTP: A Transport Protocol for Real-Time Applications*" dated July, 2003, which is incorporated herein by reference in its entirety), it is recognized that other protocols can be readily substituted in various embodiments of the invention, and would be otherwise apparent to one of ordinary skill given the contents of the present disclosure. For example and without limitation, the RTSP (see RFC 2326 entitled "*Real Time Streaming Protocol (RTSP)*" dated March 1998 and incorporated herein by reference in its entirety), SRTP (see RFC 3711 entitled "*The Secure Real-time Transport Protocol (SRTP)*" date march 2004 and incorporated herein by reference in its entirety), SCTP (see RFC 4960 entitled "*Stream Control Transmission Protocol*" dated September 2007 and incorporated herein by reference in its entirety), and/or ZRTP (see "*ZRTP: Media Path Key Agreement for Secure RTP—draft-zimmermann-avt-zrtp-10*" dated Oct. 25, 2008, also incorporated herein by reference in its entirety) protocols may be used consistent with the present invention.

Lastly, while certain embodiments of the invention are described with respect to land-based vehicles such as automobiles or trucks, the invention is in now way so limited, and may be readily applied to other vehicular or non-vehicular paradigms including without limitation rail (trains), aircraft, water craft, and motorcycles.

Methods—

Referring now to FIG. 2, a first embodiment of the generalized process 200 for transporting data (e.g., a minimum set of data or MSD) interspersed with a voice packet stream, such that a high priority call (such as an "eCall", defined below) may be supported with a packet switched network, is illustrated. As used herein, the term "high priority" refers generally and without limitation to calls or other transmissions having a greater urgency or priority than other traffic. One example of a high priority call is an emergency call for police, fire, medical, etc. assistance. Another example of a high priority call may relate to calls (even routine calls) between members of law enforcement, fire departments, military personnel, government entities, etc., or any other individual or group having elevated precedence or need for access to a communication medium.

The term "eCall" as used herein refers without limitation to emergency calls and services set forth in, inter alia, 3GPP TS 23.167 V8.1.0 (dated September 2008) entitled "Technical Specification-3rd Generation Partnership Project; Technical Specification Group Services and System Aspects; IP Multimedia Subsystem (IMS) emergency sessions (Release 8)", incorporated herein by reference in its entirety, which describes the "stage 2" service description for emergency services in the IP Multimedia Core Network Subsystem (IMS), including the elements necessary to support IP Multimedia (IM) emergency services. ITU-T Recommendation I.130, incorporated herein by reference in its entirety, describes a three-stage method for characterization of telecommunication services, and ITU-T Recommendation Q.65, incorporated herein by reference in its entirety, defines stage 2 of the method. TS 23.167 V8.1.0 also covers the Access Network aspects that are crucial for the provisioning of IMS emergency services. Other 3GPP specifications that are related to the IMS emergency services include TS 23.228 (IMS in general), and TS 23.234 (describing 3GPP/WLAN Interworking) and TS 23.271 (location services), each of the foregoing being incorporated herein by reference in its entirety. TS 25.301, also incorporated herein by reference in its entirety, contains an overall description of the UMTS Terrestrial Radio Access Network.

Other non-3GPP specifications that are related to the IMS emergency services include 3GPP2 cdma2000 HRPD IP-CAN, as specified in 3GPP2 C.S0024-A and 3GPP2 X.S0011, each of the foregoing incorporated herein by reference in its entirety.

At step 202 of the process 200, the high priority call is placed. In one exemplary embodiment, the call is automatically initiated by a client or user device, and is assigned emergency call status, such as a vehicle automatically triggering an emergency call in the event of a detected accident. As used herein, the terms "client device", and "user device" may include, but are not limited to cellular telephones, smart phones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), in-vehicle systems, or any combinations of the foregoing.

In yet another variant, the call is placed by the user, such as a user dialing an emergency call to request assistance.

The point at which (and mechanism by which) emergency status is assigned to the call may vary depending on the method of call placement, or network in which the call has been made. In one variant, the emergency call status is immediately flagged by the originating party, such as by inclusion of data indicating such status (e.g., a data field having a prescribed value, flag being set, etc.), such as in a message header. In an alternate case, the call may be placed as a special call. For example, in CS-Emergency-Calls (according to 3GPP TS 24.008, herein incorporated by reference in its entirety) the call control entity sends an EMERGENCY SETUP message to establish the call (as opposed to sending a SETUP message for normal calls). In another example, IMS-Emergency-Calls (according to 3GPP TS 24.229, herein incorporated by reference in its entirety) the UE uses a Uniform Resource Name (URN) service with a top-level service type of "sos" (as specified in RFC 5031 herein incorporated by reference in its entirety). In yet other alternative embodiments, one or more components of the routing information of the connection are used to determine emergency call status. In one such variant, the emergency call status is assigned by a network entity, such as where a packet is intercepted and treated as an emergency call due to its routing information (e.g. source or destination, such as the user or UE dialing a designated number such as 911).

At step 204 of the process 200, network access is initiated. In one exemplary embodiment, the authentication and authorization procedures normally used for cellular service are bypassed or expedited. The network may either receive an indication from the IVS that the call should be given emergency status, or the network may determine based on routing information that the call should be placed with emergency priority. Additionally, such access could be "connection-based", or alternatively "connection-less". Such network access may be initiated using any of the common transport technologies. As used herein, the term "transport" refers without limitation to any transport protocol capable of transmitting data over a physical interface (PHY) such as e.g., transport control protocol (TCP), user datagram protocol (UDP), datagram congestion control protocol (DCCP), real-time transport protocol/real-time transport control protocol (RTP/RTCP), and stream control transmission protocol (SCTP). Such network access is hereafter referred to as a transport stream, and minimally includes one or more packets comprising data such as a local source, a local destination, a checksum field, and a data field. The local source would in the exemplary embodiment be the IVS network address, and the local destination would be the address of the PSAP (not necessarily a routing center).

At step 206, a real-time protocol (such as RTP, RTSP, etc.) is established or layered over the transport stream. As described below in greater detail, such a real-time protocol minimally includes information which, when interpreted, identifies a specific time, and/or a sequence of timed events (e.g., packets with respective time values or indices).

At step 208 of the process, two or more "streams" are generated, at least one of which is a machine-readable data stream, and at least one of which is a digitized (e.g., compressed) representation of voice or other such payload (user) data. As used herein, the term "stream" may be used to refer to both substantially continuous and non-continuous (e.g., periodic or intermittent) flows of data.

In one implementation of the foregoing process, a code-excited linear prediction (CELP)-based voice coder (vo-coder) such as one of the ACELP, QCELP, RCELP, LD-CELP (e.g., G.728), etc. is used to digitize the user's voice received via an analog microphone. The machine-readable data stream remains readable and writeable by other network components, whereas the digital representation of voice is protected from modification by other network components.

At step 210 of the process, the two streams are interspersed for transmission via the network, using the real time protocol. Specifically, in one variant, the data from the machine-readable data stream is embedded within one or more RTCP packets that are then inserted or interspersed into the user data packet stream (e.g., RTP packets carrying the aforementioned digitized voice). This interspersing may be accomplished using any number of approaches common within the digital arts, including such methods as data multiplexing (e.g., wherein a multiplexer or interleaver is used to distribute one data stream within one or more others), and or piggybacking (e.g., where the data is appended or otherwise attached to an extant stream).

At step 212, a session is initiated which carries the interspersed streams comprising the combination of machine-readable data, and the digital representation of voice. Various mechanisms can be used to establish this session, including for example a session-based protocol such as SIP (described subsequently herein). The session is conducted on a single network connection, where the network path is characterized by the source endpoint (IVS) and destination endpoint (PSAP). While the path within the network may be constructed using "hops" between a plurality of transport layer connections, the path remains identical for both the machine-readable data and for the digital representation of voice. That is, the path between endpoints may change, but it will always be identical for the machine-readable data and the digitized voice or other "payload".

Furthermore, the multi-streamed session is conducted in real time, and both voice and data are granted the benefits of emergency call status handling.

Upon reception at the PSAP, the two or more data streams are separated, such as via demultiplexing, routing of packets based on data resident in the headers thereof indicating identity (e.g., RTCP packet versus RTP packet) and hence which stream each packet belongs to, or yet other well known mechanisms. The machine-readable data stream is processed to determine at least in part, one or more parameters related to the IVS. The digital representation of voice is reconstructed into an audible signal for distribution, storage, and/or playback to an operator or speech recognition system.

It will be appreciated that while the illustrated embodiment utilizes a machine-readable data stream in conjunction with digitized voice, the invention may be practiced with equal success where the secondary component of the stream is not digitized voice, but rather other types of digitized content (e.g., another media such as video, file data, etc.), the invention not being restricted to voice data alone. For instance, one of the IVS system devices or sensors (described in greater detail subsequently herein) might comprise a camera, which could generate a packet stream of image or video data that can transmitted to the PSAP if desired.

Note also that the voice and/or video may be obtained passively or without the user's knowledge, such as where the vehicle has been stolen, and an on-board microphone and/or camera s used to stream voice/video data to the PSAP or other entity without the thief's knowledge.

Moreover, in certain embodiments of the invention it may be feasible to use RTCP, even without RTP-content. Such embodiments may be practiced without a "payload" per se; e.g., such as a call designed to be automatically initiated and which transfers only prescribed data relating to an event (e.g., a theft detection and reporting system which transmits VIN, vehicle location as ascertained by AGPS, etc.).

Moreover, the communication of any "payload" can be of the M2M (machine-to-machine) variety; see, e.g., co-owned and co-pending U.S. patent application Ser. No. 12/231,095 filed Aug. 29, 2008 and entitled "Methods and Apparatus for Machine-to-Machine Based Communication Service Classes", which is incorporated herein by reference in its entirety, for one exemplary M2M implementation within a wireless (e.g., cellular) system. Additionally, while M2M data communications may provide the basis of the "payload" in the present invention, it will also be appreciated that classification of a given call as both "emergency" (or high priority more generally) and "M2M" may be used as the basis for different call handling and routing decisions of the type described in the foregoing disclosure. For instance, calls which are both M2M and "emergency" in nature may be given a lower priority than human-based calls, since it is presumed that an emergency associated with a machine (i.e., the instigator of the call) has a lower priority than saving human life. However, this may not always be the case, such as where the M2M "machine" initiating the call is one associated with a critical piece of infrastructure that may adversely impact human life, such as e.g., an electrical power distribution substation transformer associated with a large metropolitan area or a hospital, a bridge stress/strain sensor indicating imminent failure, etc. Hence, the present invention contemplates that not only the data portion embedded into the RTCP or similar packets, but also the M2M data (i.e., generated by the initiating machine relating to its parent device, and embedded into the RTP or "payload" packets) can be used as the basis for differentiating call handling, prioritization, and/or routing.

Figure 2A:
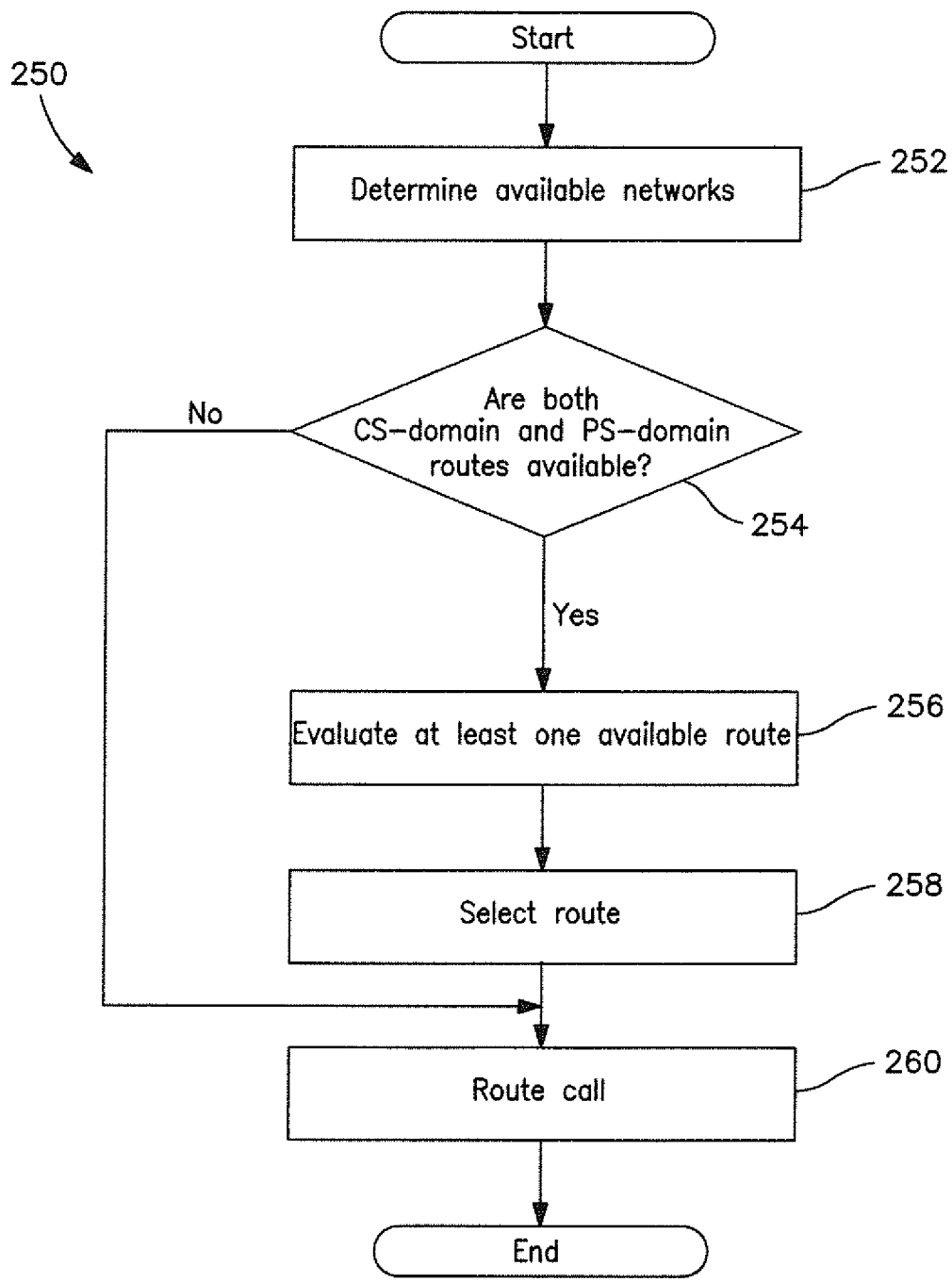
FIG. 2A is a logical flow diagram illustrating one embodiment of a domain arbitration/selection process for routing emergency call data in accordance with the invention.

Referring now to FIG. 2A, one embodiment of the method of arbitrating and selecting between CS and PS domain networks is described. While it will be recognized that the present invention is particularly adapted for operation over a packet-switched network domain, there none-the-less may be cases where CS-domain services are also available. Hence, rather than always simply defaulting to PS-domain transport, another variant of the invention employs selection or arbitration logic before deciding to place the emergency call using one domain or the other. This logic may be implemented for example on a network apparatus (e.g., call routing controller) or within the client device (e.g., IVS) itself, or both.

As shown in FIG. 2A, the first step 252 of the method 250 is determining if both circuit-switched and packet-switched network routes are available to route the call. This data may be hard-coded (e.g., based on network infrastructure, and hence non-variant), or alternatively based on one or more status indicators. For instance, circuit-switched transport may be included as part of the network infrastructure; however, that transport may not be presently available (such as e.g., due to maintenance, equipment failure, or very high loading/congestion).

Per step 254, if both CS-domain and PS-domain routes are available, then the selection logic next evaluates at least one of the routes against at least one selection criterion (step 256). For example, in one variant, both routes are evaluated for congestion (which may be indicated by the latency associated with the packet transport in the PS domain, such as late-arriving packets, or long delays in establishing an end-to-end circuit in the CS domain). Alternatively, the evaluation might comprise employing a hierarchical approach; e.g., evaluate only PS-domain for congestion, and then if satisfactory, use PS domain—otherwise, use CS domain. More than one evaluation criterion may be used as well; e.g., congestion/latency; reliability; available data capabilities/payload, etc. Myriad different evaluation schemes and criteria will be recognized by those of ordinary skill given the present disclosure.

Per step 258, one of the two routes selected (or both, depending on priority of the call and potential reliability/latency issues) based on the foregoing evaluation of step 256, and the call routed over the selected domain(s) per step 260.

The foregoing exemplary methods of FIGS. 2 and 2A underscore many of the advantages of the present invention over the existing solutions for the transmission of data previously referenced (i.e., Short Message Service (SMS); User to User Signaling (UUS); Unstructured Supplementary Service Data (USSD); Global Systems for Mobile communications (GSM) CS Data; Dual-Tone Multi-Frequency (DTMF); and In-band modem/Signaling Application). Specifically, SMS uses unreliable transfer of one-hundred forty (140) byte messages through the cellular network from one terminal to another. SMS messages are treated in the network using a store and forward system, to facilitate better management of network resources; however, one major drawback of SMS is that Short Messages are routed to the SMS Center of the home network of the user, whereas eCalls preferably should be treated within the Visited Network (to enable roaming subscribers). A roaming user initiating an eCall currently has their SMS routed to their home network for storage, prior to forwarding. The indirect handling of SMS routing requires significant modification for integration with other eCall mechanisms. Another drawback to SMS is its comparatively unreliable service; SMS neither guarantees delivery, nor does it specify a delivery time; feedback from the receiver to the sender is optional, and may not be timely, or reliable. Lastly, SMS depends on a Subscriber Identity Module (SIM) to be present within the mobile device for authentication. Each of these drawbacks is advantageously overcome by the technology disclosed herein.

Similarly, UUS is another service that allows user-to-user signaling of small portions of data during or shortly after the call setup. UUS limits the amount of data transferred. In some UUS types, the MSD would need to be reduced to a highly restrictive thirty-two (32) bytes. Furthermore, operators have not widely deployed UUS; an upgrade to the current network equipment would be expensive and difficult. UUS is a service that is implemented as part of the Call Control protocol, and is only available in CS domain calls or in fixed line protocols like an Integrated Services Digital Network ("ISDN"). In the PS domain it is currently not available, and current network operators explicitly do not allow UUS for emergency calls.

USSD is a similar standard to UUS, and has some similar features. USSD allows transmission of one-hundred eighty (180) bytes or more of information. USSD can operate independently, or at any time to supplement an ongoing call. Much like UUS and SMS, USSD transmissions are routed to the home network, thus modifications to USSD for eCall handling during roaming must re-route the eCall to the visited network. USSD, like UUS, is currently forbidden for use in emergency calls. USSD is also implemented as part of the CS domain protocols, and is only available in CS domain calls in the cellular network (and not the PS domain).

Other legacy circuit-switched data transmission techniques which are not suitable for eCall operation include GSM CS Data, and Dual Tone Multi Frequency (DTMF). GSM CS Data is capable of operating at a 9.6 kbps data transfer rate in the CS domain. Unfortunately, the setup time for a GSM CS data call exceeds the requirements of the eCall service, and GSM CS data is only operable within the CS domain (GSM is a CS based network). DTMF could feasibly be used to carry MSD very slowly; however, it would take more than thirty-six (36) seconds to transmit one-hundred eighty (180) bytes. Furthermore, DTMF is not reliable, and offers no error correction.

In-band modem signaling is a currently used method, and has garnered some commercial success in the OnStar™ system used in the United States. The MSD is transmitted in-band in the beginning of the call using the setup voice connection. Thus routing and addressing is not a problem for the network and the MSD is always received by the Public Safety Answering Point (PSAP). Unfortunately, some effort must be spent by both the IVS terminal as well as the PSAP to decode the MSD data from the voice stream. In addition, in certain networks, the network must transcode the voice data from one voice codec to another due to potential mismatches of supported voice codecs between the IVS and PSAP. This transcoding process may introduce errors into the eCall MSD data portion; or even fail totally if the transcoding creates unrecognized data transmission artifacts embedded within the voice stream.

Based on the foregoing, the many advantages of the technology disclosed herein over legacy and traditional approaches are readily evident.

RTCP APP Packet Protocol—

In one exemplary implementation, the present invention contemplates placing the data to be transmitted (e.g., Minimum Set of Data (MSD)) into the RTP Control Protocol (RTCP) packets that are transmitted within an eCall voice connection. The timing and frequency of RTCP packets is described in inter alia "*RTP, Audio and Video for the Internet*" Colin Perkins; Addison-Wesley, 2003 ISBN 0-672-32249-8 2003, incorporated by reference herein in its entirety, and RFC 3550 previously incorporated herein.

Most RTP implementations require some minor overhead. Specifically, some information regarding the reception quality at the receiver may be used for the senders to efficiently transmit in real time. In addition, receivers may need information about the other participants of the session; such information may include for example details as to whether other participants are senders, receivers or both. Control data is also periodically communicated; the associated RTP Control Protocol (RTCP) defines and describes how and when this additional control information is injected as embedded data within the stream of RTP-embedded user data packets. Thus RTCP increases the number of packets, and the amount of data that is transmitted, when compared to other alternatives. However, RTCP signaling normally consumes less than five percent (5%) of the total data bandwidth of a real-time stream.

For a bi-directional voice connection operating at 12.8 kbps, between the IVS and the PSAP, it can be expected that RTCP packets will be sent approximately once every second. In the beginning of a connection, the first RTCP packet will be sent after half of this interval (0.5 seconds).

RTCP defines five packet types that include: (1) Receiver Reports; (2) Sender Reports; (3) Source Descriptions; (4) Membership Management; and (5) Application-Defined (APP) packet types. Whereas the first four packet types have a defined structure and do not allow for extension of packet structure, the APP packet type is flexibly defined to accommodate application-specific information. Accordingly, in one exemplary embodiment of the present invention, the RTCP APP packet type is utilized to transport the MSD from the In Vehicle System (IVS) to the Public Safety Answering Point (PSAP).

Figure 3:
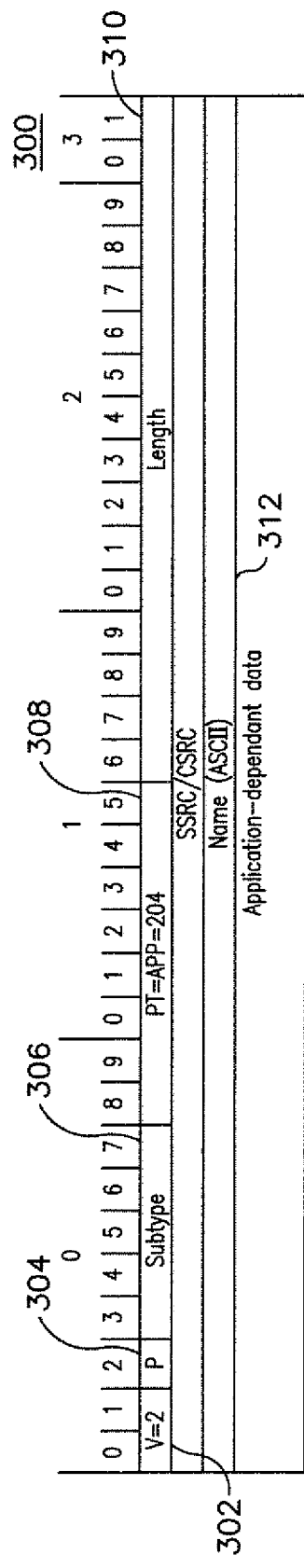
FIG. 3 illustrates a generic Real Time Protocol (RTP) Application Packet according to the prior art.

Referring now to FIG. 3, the prior art RTP APP packet 300 format is comprised of a number of information elements. Specifically, the first information element 302 identifies the Version [V] of the protocol, in the current version of the RTP and RTCP protocol this value would typically be set to two (represented in binary as 10#b). The second information element 304 is the padding bit [P], which identifies if this individual RTCP packet contains some additional padding octets at the end which are not part of the control information but are included in the length field. The last octet of the padding is a count of how many padding octets should be ignored. For example, if the RTP APP packet 300 is eight (8) octets, the last octet includes the bits 56 to 63. In another example, if the length is twelve (12) octets, the last octet includes the bits 88 to 95.

The third information element 306 is the subtype [subtype] which may be used as a subtype to allow a set of APP packets to be defined under one unique name, or for any application-dependent data.

The fourth information element 308 is the packet type [PT] that indicates the RTCP APP packet, in this example signified with the value [204] (represented in binary as 11001100#b).

The fifth information element 310 is the length field [length] of the RTCP packet in a 32-bit word minus one (1), which includes the header and any padding.

The sixth information element 312 is the name field [name] that defines a set of RTCP APP packets defined by the same person and/or used for the same purpose.

The seventh information element 314 is application-dependent data [application-dependant data] which is an open ended field that is used by the application (i.e. not used by the RTCP APP processing). One specific requirement for application-dependent data length is that it is a multiple of thirty-two (32) bits, so as to correctly fit at 32-bit word boundaries.

Referring now to FIG. 3A-D, various embodiments of an exemplary RTP APP packet 350 formats used to embed eCall data in accordance with the present invention are illustrated. Similar to the prior art packets of FIG. 3, the first information element 352 identifies the Version [V] of the protocol, in the current version of the RTP and RTCP protocol this value would typically be set to two (represented in binary as 10#b).

Likewise, the second information element 354 is the padding bit [P], which identifies if this individual RTCP packet contains some additional padding octets at the end which are not part of the control information but are included in the length field.

The third element is a subtype field (described in greater detail below).

The fourth information element 358 is the packet type [PT] that indicates the RTCP APP packet, in this example signified with the value [204] (represented in binary as 11001100#b).

The fifth information element 360 is the length field [length] of the RTCP packet in a 32-bit word minus one (1), which includes the header and any padding.

Figure 3A:
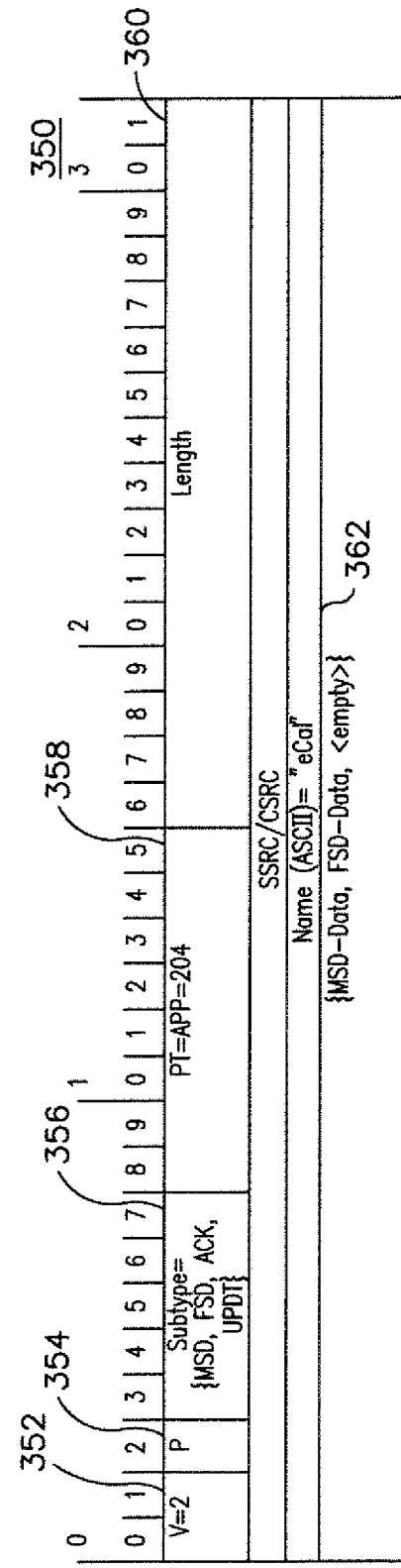
FIG. 3A illustrates one exemplary embodiment of a packet format of a Real Time Protocol (RTP) Application Packet adapted to provide emergency call service for an In-Vehicle System (IVS) according to the present invention.
Figure 3B:
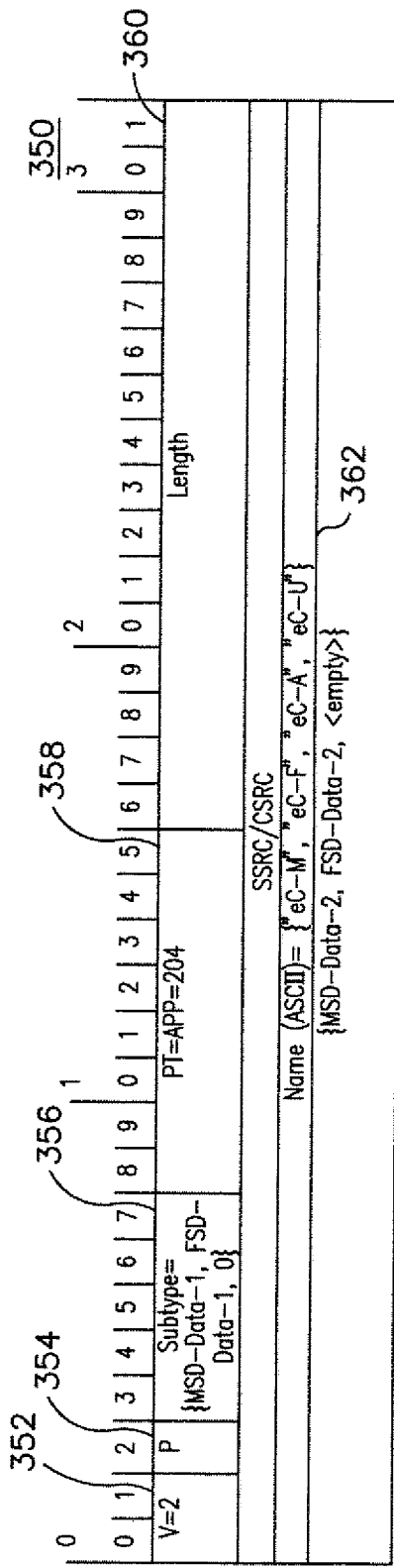
FIG. 3B illustrates another exemplary embodiment of a packet format of a Real Time Protocol (RTP) Application Packet adapted to provide emergency call service for an In-Vehicle System (IVS), showing a plurality of exemplary settable fields having predefined values.

FIG. 3A and FIG. 3B illustrate exemplary embodiments of an RTCP APP packet type. To use the existing RTCP APP packet format 350 optimally, all eCall-defined packets maintain a common string value (e.g. "eCal") within the name field 362 (FIG. 3A). Additionally the subtype field 356 values defined for the eCall service may distinguish different data types such as the Minimum Set of Data (MSD), Full Set of Data (FSD), etc. Alternatively, other implementations could indicate in the name field 362 both the packet to be eCall specific and the type of data that is contained in the packet. The subtype field 356 could then be used for other purposes, such as for example the first five bits of the MSD or FSD (as shown in FIG. 3B).

RTP and RTCP are transmitted in the present embodiment via the UDP transport protocol, which as previously described, does not guarantee the sender that a sent packet has been correctly received (unlike TCP). In certain situations, it may be desirable to provide an acknowledgement (ACK) by the receiver; i.e., either, (i) that the packet has been received intact and timely, or else (ii) a failure mode (e.g. that a packet was corrupted, late, or missing). In one exemplary embodiment, the RTCP APP packets may be used to acknowledge successful reception by the receiver. It is noted that in any of the RTCP APP packets (as shown in FIG. 3A-D), the RTCP format easily conveys acknowledgements by defining a subtype field value 356 or an appropriate name field value 362.

Figure 3C:
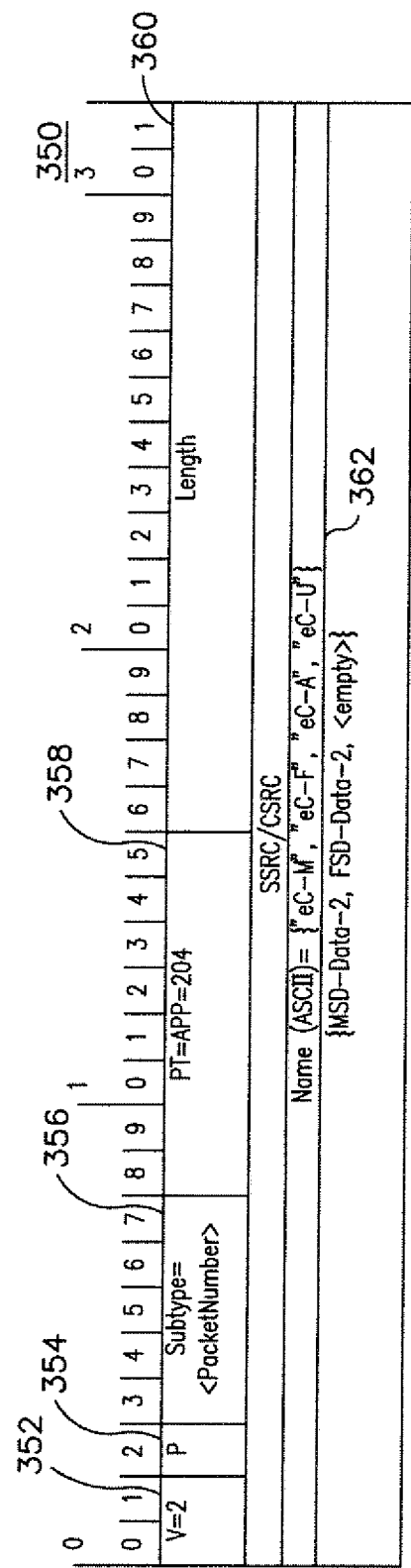
FIG. 3C illustrates yet another exemplary embodiment of a packet format of a Real Time Protocol (RTP) Application Packet adapted to provide emergency call service for an In-Vehicle System (IVS), showing a field adapted to establish packet ordering.
Figure 3D:
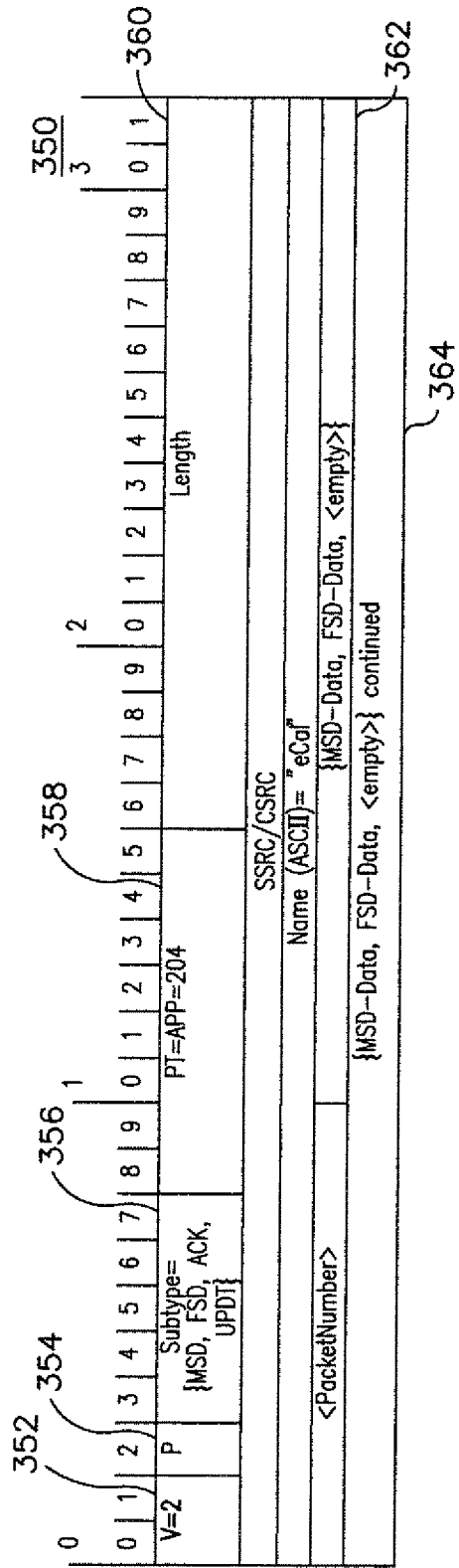
FIG. 3D illustrates one embodiment of an extensible packet format of a Real Time Protocol (RTP) Application Packet adapted to provide emergency call service for an In-Vehicle System (IVS).

Referring now to FIG. 3C and FIG. 3D, in yet another alternative embodiment, the receiver of the eCall data (e.g., the PSAP) may be enabled to acknowledge a specific eCall data message if more than one messages is sent by the sender (e.g. the IVS). The addition of a packet number in the subtype field 356, and a reference correlating the packet number to the appropriate acknowledgement message, would thus allow proper, in-order reception, and differentiation of multiple messages. The transport of the packet number can be accomplished via, for example, the subtype-field 356 as shown in FIG. 3C for either the eCall data packet, or its corresponding acknowledgement packet. Alternatively, the packet number can be included in the application-specific data field 364 as shown in FIG. 3D.

In an additional embodiment, the PSAP may possess the ability to request an update of the eCall data from IVS. An update message can be constructed in a format similar to the acknowledgement packets (or any packet format adapted for transmission from the PSAP to the IVS). Update requests may also contain an indication specifying the information which should be updated; such updates may be used for example to poll specific dynamic conditions. In one such variant, only the information requested (or that which has changed since the last update) is transmitted in order to reduce overhead. Furthermore, this information may be encapsulated within the application-specific data field 364 or other location if desired.

In yet another implementation, faster transmission requirements for specified portions of eCall data can be accommodated by splitting the one-hundred forty (140) bytes of data into a first portion that is transmitted in a first RTCP packet, and a second portion that is transmitted in one or more RTCP packets separate from the first. Any combination of first and second data lengths could be utilized. In one such example, the first packet could contain the first five information elements of the MSD that are together not bigger than thirty eight (38) bytes, and the second portion could contain the remaining portion that is up to one-hundred and six (106) bytes of size. The smaller first packet is transmitted very quickly, and the second remainder packet could be transmitted in the next RTCP transmission that is scheduled by the IVS.

Furthermore, in addition to the previous embodiments discussed, a cellular mobile network supporting more than one eCall mechanism, may also support various messaging formats for indicating which eCall mechanism should be utilized. Such an indication would occur during call establishment, to identify which mechanism is applicable for a particular eCall session.

Alternatively, a negotiation of the mechanism could also be done during the call setup. One popular protocol used to describe and initialize session information is the well-known Session Initiation Protocol (SIP). The IP-based Multimedia Core-Network Sub-System (IMS) is a network architecture based on SIP; IMS defines the methods of session establishment, manipulation and termination in a mobile cellular network. Specifically, PS domain calls are typically negotiated and set up within an IMS-framework using SIP before transferring any actual data. See, inter alia, 3GPP TS 23.228 V8.6.0 (2008-09) entitled "Technical Specification-3rd Generation Partnership Project; Technical Specification Group Services and System Aspects; IP Multimedia Subsystem (IMS); Stage 2 (Release 8)" incorporated herein by reference in its entirety. Within SIP, the Session Description Protocol (SDP) is used to define parameters associated with a given session.

Within the SIP framework, it is possible to add an "a-line" (attribute line) in the session description to indicate which eCall data signaling mechanism is used. For example, in a system where there are two supported formats available (e.g., in-band signaling over RTCP, and voice codec), two separate stream types could be signified with appropriate a-line descriptors:

```
a=eCallDataTxMechanism:InBandRTCP
a=eCallDataTxMechanism:InBandVCodec
```

An appropriate response would select one of the two stream options based on e.g., selection logic resident within the network. This selection might be based for example on the indigenous capabilities of the calling device, network optimization or operational criteria, latency, and so forth.

It is noted however that in the particular context of SIP, the primary SIP RFC (RFC 3261) does not support resource prioritization; however, there is a supplementary RFC (RFC 4412 entitled "Communications Resource Priority for the Session Initiation Protocol (SIP)" dated February, 2006, and incorporated herein by reference in its entirety) that is designed to extend SIP's capability in respect to call prioritization. Specifically, RFC 4412 defines two new SIP header fields that allow a device to request that a call be treated by downstream elements as "high priority".

EXAMPLE

The following example further illustrates one exemplary implementation of the packet structure and messaging formats of the aforementioned RTCP APP protocol, as used for initiation and processing of an eCall, utilizing both voice and in-band signaling data streams.

According to one embodiment, to initiate a packet-switched call, an In Vehicle System (IVS) establishes communications with a base station. In certain multi-mode systems, the IVS may be required to identify itself as a packet switched device (e.g. such as where both CS and PS networks overlap, or both capabilities are available). The base station grants the IVS a dedicated physical traffic resource (e.g., time slot, frequency band, code domain, etc.), and a logical channel. The assignment of the logical channel enables the IVS to communicate with the IP-based Multimedia Core-Network Sub-System (IMS) via the logical channel, which is transmitted on the assigned dedicated physical traffic resource.

The IVS initiates a call with the PSAP using the session initiation protocol (SIP). A message exchange of the type illustrated in FIG. 4 must take place before voice or eCall data can be exchanged via the established session. Note that in the messaging illustrated in FIG. 4, all contents of the SIP messages are not given in detail for purposes of clearer illustration.

Figure 4:
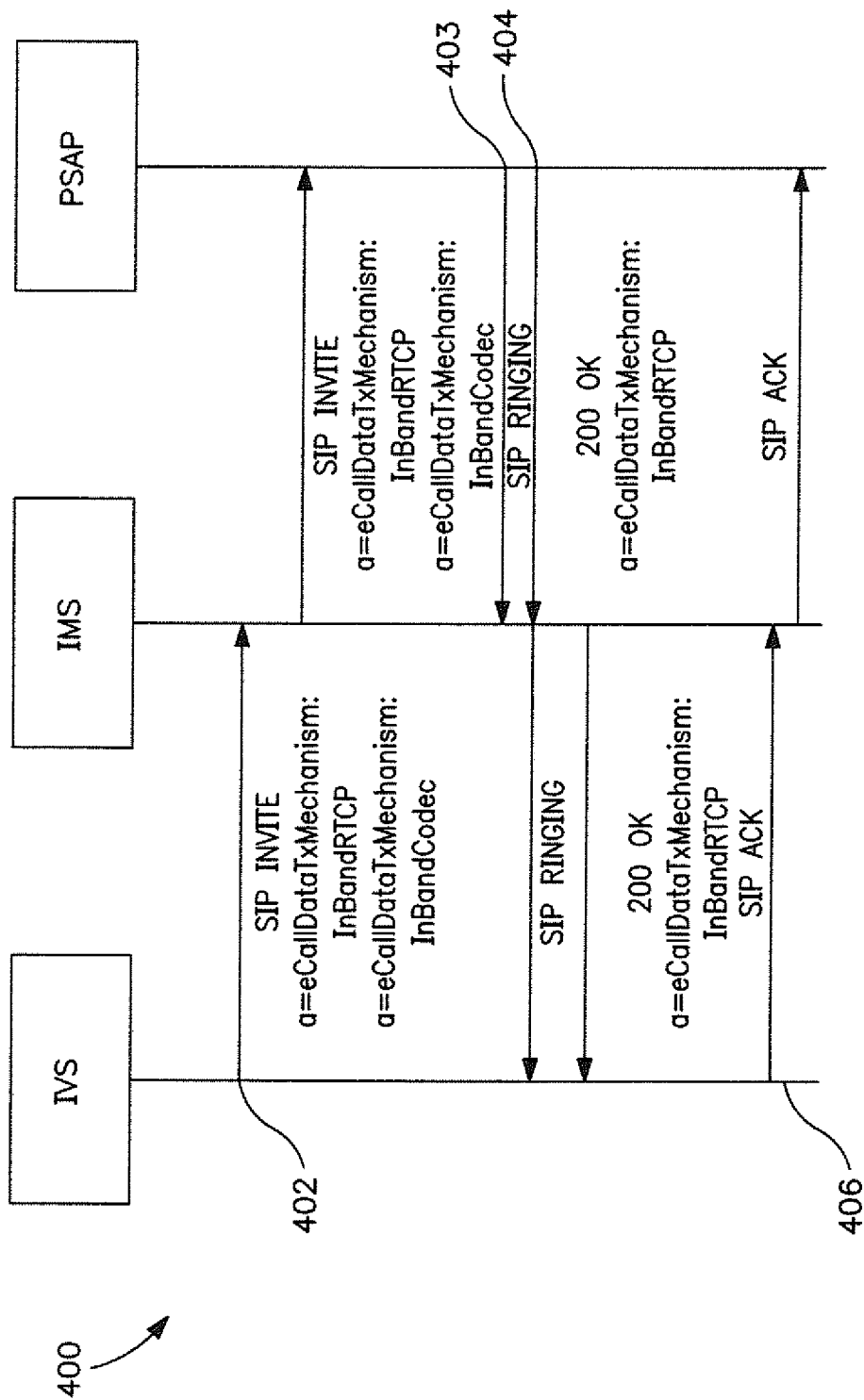
FIG. 4 graphically illustrates one exemplary embodiment of a Session Initiation Protocol (SIP)-based call setup process according to the invention, adapted to provide emergency call service for an In-Vehicle System (IVS).

As shown in the exemplary exchange of FIG. 4, the IVS sends an initial SIP INVITE request 402, encapsulated in an IP packet with associated IP and UDP headers. The SIP INVITE request includes the destination address of the terminal being called (e.g. PSAP), and indicates that the called terminal is being invited to participate in a call session (e.g., eCall). FIG. 4 also illustrates the custom "a-lines" utilized within the session description of the SIP INVITE message previously described herein. The exemplary SIP INVITE of FIG. 4 includes both of the above-referenced a-lines for transmission of emergency related data, as in-band voice codec signaling or in-band RTCP, in accordance with the principles of the present invention.

Typically, the base station would send the INVITE request to various network entities for access control, authorization and accounting. In an eCall situation, the network entities will selectively skip or preempt some or all of the access, authorization and accounting stages. This selection may also be varied dynamically based on the type or priority of call; e.g., an "emergency" call may have all of the foregoing stages skipped, while a high-priority yet non-emergency call may utilize some of these stages to accomplish specific goals (e.g., a high-priority inter-law enforcement transmission may utilize authentication to be sure that "spoofing" or similar attacks do not occur).

A SIP RINGING response 403 may optionally be returned from the PSAP once it has been located and has received the INVITE request.

Once the eCall has been accepted by the PSAP, it returns a SIP 200 OK response 404. Once the 200 OK response 404 is received, the IVS sends a SIP ACK message 406 to acknowledge the OK response. The 200 OK 404 contains the choice from both options that the PSAP has chosen. As shown, the PSAP has selected the RTCP signaling. At this point, the call has been set up, and communication of the interspersed voice and other real-time data can proceed.

Transmission of MSD Data

Figure 5:
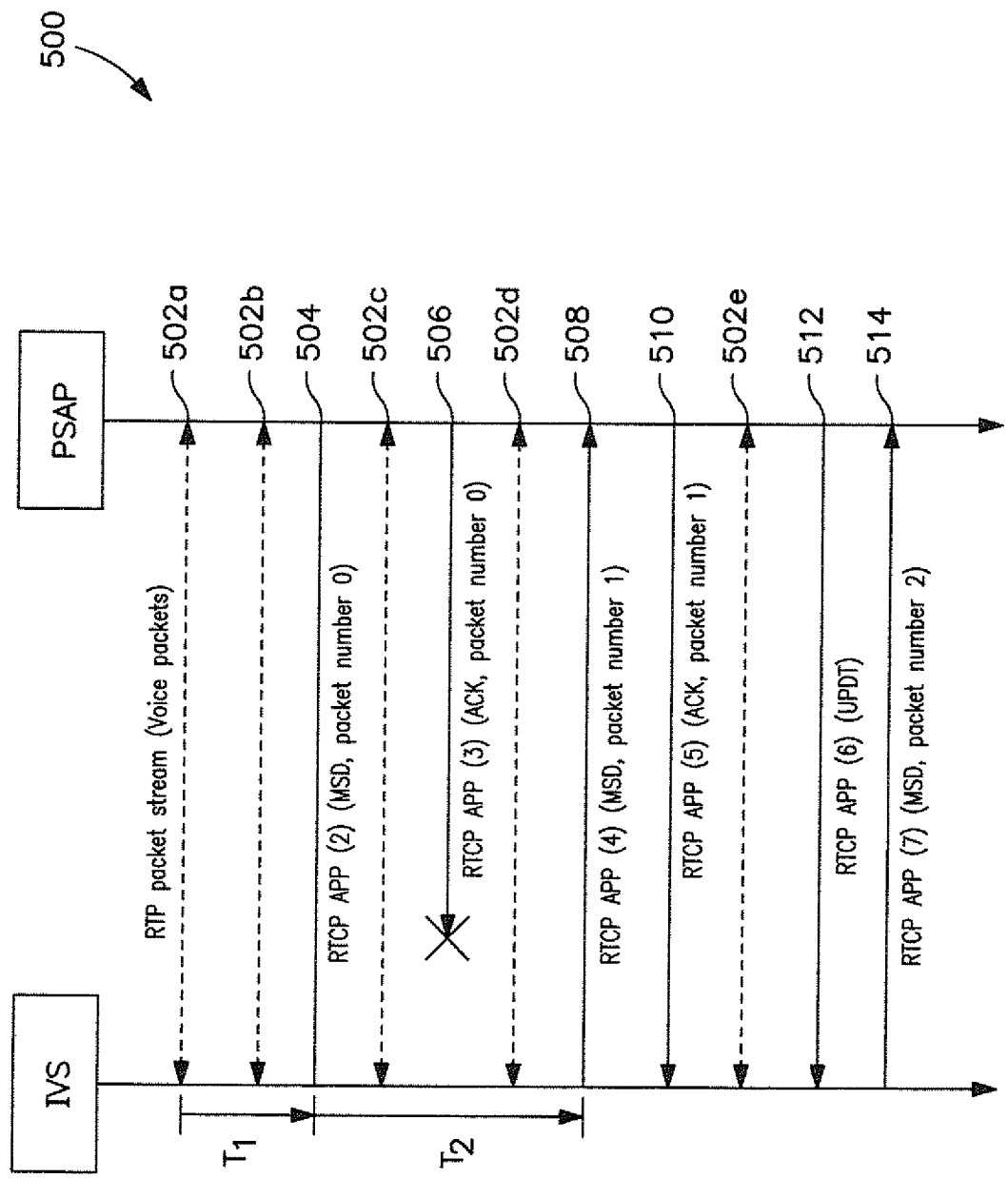
FIG. 5 is a graphical representation of an exemplary cellular PSAP system communicating with an IVS, utilizing the methods and apparatus according to one embodiment of the present invention.

Referring now to FIG. 5, after the session setup has been completed (e.g., the SIP exchange of FIG. 4 has successfully arbitrated a session having voice and data components), the exemplary messaging flow 500 between an IVS and a PSAP is performed. The exchange of voice data is started by transmission of RTP packets containing coded voice frames at 502a, 502b. At a scheduled time ($T_1$) later, the first RTCP packet is transmitted per step 504. This packet contains in one embodiment the RTCP APP packet 350 as previously described herein with respect to FIGS. 3A-3D.

In one exemplary embodiment of the invention, the following information elements are set in the first RTCP APP (2) packet sent at step 504: (i) Name 362=eCal, (ii) Subtype 356=MSD-Data, and (iii) PacketNumber (first eight (8) bits of application specific field 364)=0 (zero). The rest of the application specific field 364 contains the remaining MSD.

After the first RTCP APP (2) packet has been generated, further RTCP packets are produced at subsequent intervals. These intervals are, in one implementation, periodic in nature although there is no specific requirement that the packets necessarily be so. Utilizing a regular interval of a time ($T_2$) will simplify the processing of RTCP packets between the IVS and PSAP. Between periodic RTCP packet transmissions, RTP voice packets can continue to be transmitted such as is shown in steps 502c, 502d, 502e, etc.

In the illustrated embodiment, the generated RTCP packets contain APP packets for eCall data, until such point as an acknowledgement of successful reception from the PSAP is received. As shown in FIG. 5, the PSAP receives the first RTCP APP (2) packet at step 504; the PSAP generates an RTCP APP (3) packet at step 506, responsive to the receipt of the first RTCP APP (2) packet, to acknowledge successful reception. The RTCP APP (3) packet (ACK) is sent with the following inventive information elements set: Name 362="eCal"; Subtype 356=ACK, PacketNumber (first eight (8) bits of application specific field 364)=0 (zero) to acknowledge packet 0; the rest of application-specific field is empty.

In the hypothetical example of FIG. 5, the ACK (3) transmitted at step 506 is lost due to a failure or interference in the air interface (see "X" at step 506). The IVS expects the subsequent acknowledgment; thus, the IVS detects that the acknowledgment has not been received correctly and/or timely. Therefore, at a prescheduled time ($T_2$) later, the second RTCP APP (4) packet is sent at step 508 comprised of the following information elements: Name 362="eCal"; (2) Subtype 356=MSD-Data, PacketNumber (first eight (8) bits of application specific field 364)="1" (one); the rest of the application-specific field contains the MSD. This packet is received and acknowledged by the PSAP at step 510 with a RTCP APP packet (5) comprising: Name 362="eCal", Subtype 356=ACK, PacketNumber (first eight (8) bits of application specific field 364)="1" (one) to acknowledge packet 1; the application-specific field is left empty. After the successful reception of the acknowledgement by the IVS, the transmission of eCall data is stopped, and voice packets continue to be exchanged at step 502e.

Requested Update Procedure

Also depicted in FIG. 5 is an optional update request procedure. Specifically, at step 512, the PSAP requests an update of the MSD; in certain situations, the PSAP may require updates because the information in the MSD may be dynamically changing. Accordingly, an RTCP APP (6) packet is transmitted at step 512 comprising the following information elements: Name 362="eCal", Subtype 356=UPDT, the PacketNumber (first eight (8) bits of application specific field 364). The rest of the application-specific field are left empty.

The IVS answers the request at step 514 with an updated RTCP APP packet (7) that includes the following field entries: Name 362="eCal", Subtype 356=MSD-Data, PacketNumber=2 (two). The rest of application-specific field contains the updated MSD.

In an alternative embodiment, the update request RTCP APP packet (6) sent at step 512 may initiate a request to see if a FSD is available and, if so, the RTCP APP packet (7) sent at 514 may also indicate FSD-Data in the Subtype (and contain FSD in the application-specific field). It is also contemplated that the IVS continues to send MSD packets similar to those sent at steps 504 and 508 so long as any information in the most recently calculated MSD differs from the last MSD sent, although other logic or criteria may be applied (e.g., no changes for n successive packets or intervals, etc.).

Segmented Packets

In an alternative implementation, eCall data may be segmented into more than one RTCP packet. For example, the information elements of the RTCP packet (2) sent at 504 may change such that a first packet is constructed comprising the following information: Name 362="eCal", Subtype 356=MSD-Data-Segmented, PacketNumber=0 (zero), a field for the SegmentNumber=0 (zero), with the rest of application specific field containing the first thirty eight (38) bytes of the MSD.

Thereafter, at a later time, a second segmented packet is produced comprising: (1) Name 362="eCal", Subtype 356=MSD-Data-Segmented, PacketNumber=0 (zero), SegmentNumber=1 (one), and the rest of application specific field containing the remaining portion of the MSD. At step 506, the acknowledgement message would then acknowledge the complete packet 0 (i.e. both segments) only after both segments have been received at the PSAP. The ACK must specify the packets and/or segments being acknowledged. Accordingly, in one variant, the ACK may contain both a packet number and a segment number. If no acknowledgement has been received by the IVS it will generate a new MSD (containing both segments).

Exemplary Network Apparatus—

Figure 6A:
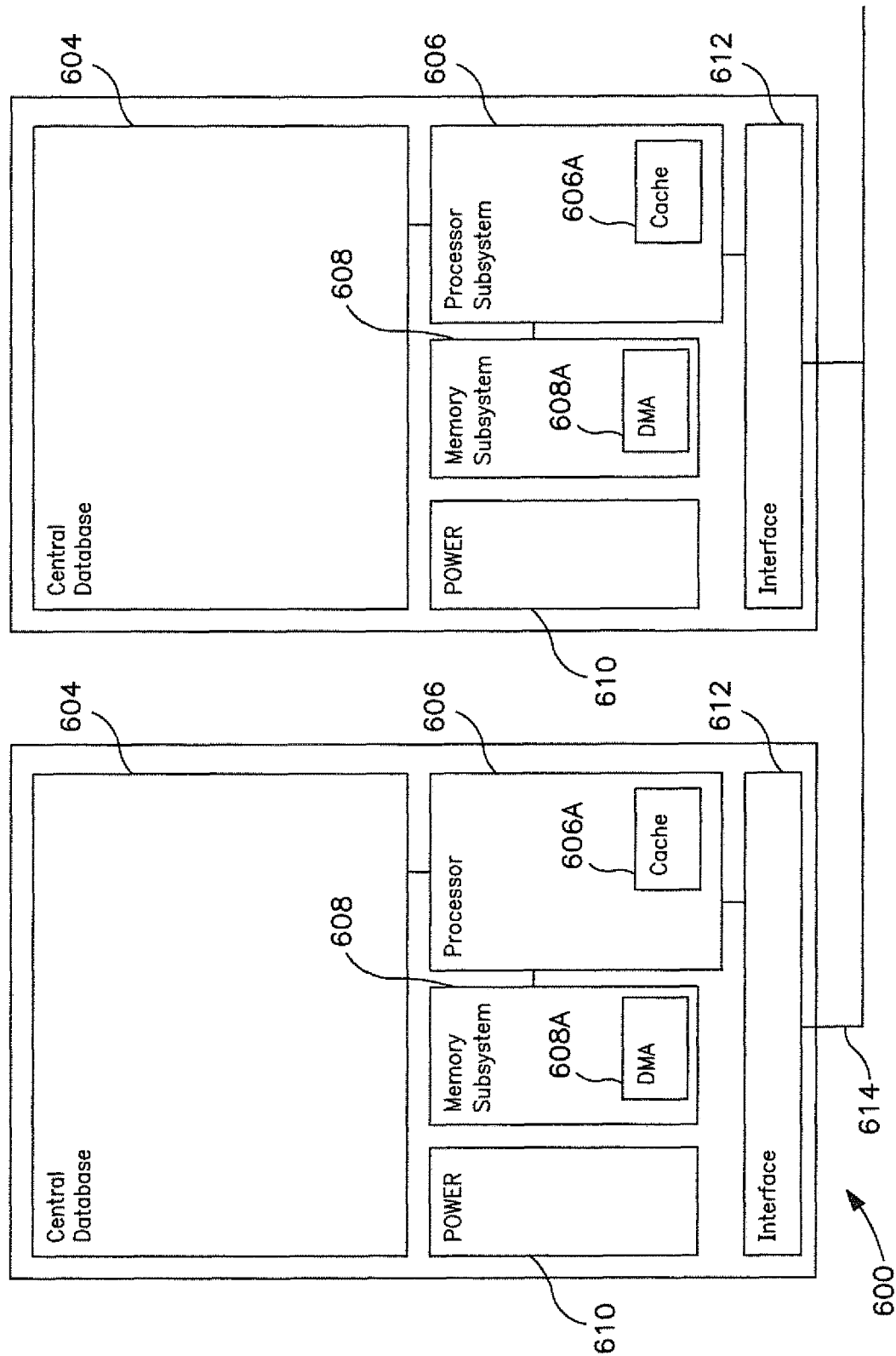
FIG. 6A is a block diagram illustrating one embodiment of a PSAP apparatus according to the present invention.

Referring now to FIG. 6a, an exemplary network apparatus (e.g., a Public Safety Answering Point (PSAP) subsystem) 600 useful in implementing the methods of the present invention is illustrated.

The illustrated embodiment of the apparatus 600 includes one or more server units connected with a central database 604 and comprising a processor 606, operational memory 608, power 610, and external network interface 612. As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

The server units of FIG. 6a are connected by an external bus 614 in one configuration.

As shown, the central database 604 may be divided among many individual machines, but function as one logically coherent database. The central database includes a listing of unique identifiers, and corresponding current and historic data (e.g. minimum set of data or MSD) stored to a computer readable medium (e.g., hard disk drives/RAID arrays, Flash memory, etc.).

The processor subsystem 606 may comprise a microprocessor (CPU), digital signal processor, RISC core, field-programmable gate array, and/or plurality of processing components. As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem may also comprise an internal cache memory 606A. The processing subsystem is connected to the logical central database 604, a local memory subsystem 608, and an external network interface 612 such as for communication with other local or remote entities via e.g., networking or data bus protocols.

The memory subsystem 608 may include one or more memory components which may for example, comprise non-volatile (e.g. ROM, FLASH, etc.), and volatile (e.g. RAM, DDR-RAM, QDR-RAM, etc.) components. It will be appreciated that the term "memory" may include any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The memory subsystem may also comprise DMA type hardware 608A of the type well known in the computer arts, so as to facilitate faster data accesses.

The illustrated power management subsystem (PMS) 610 provides power to the server unit, and may comprise an integrated circuit and/or a plurality of discrete electrical components. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

A fail-over or redundant system (including an uninterruptible power supply, or UPS, not shown) may also be utilized for backup if desired, so as to further the aim of making the apparatus available without interruption.

The illustrated apparatus may also be placed in direct or indirect data communication with other apparatus (e.g., other emergency services apparatus of the network operator, network bridges, gateways, etc.) so that information regarding emergency conditions may be readily propagated across the network as a whole, and even to other types of networks if desired.

Exemplary IVS Apparatus—

Figure 6B:
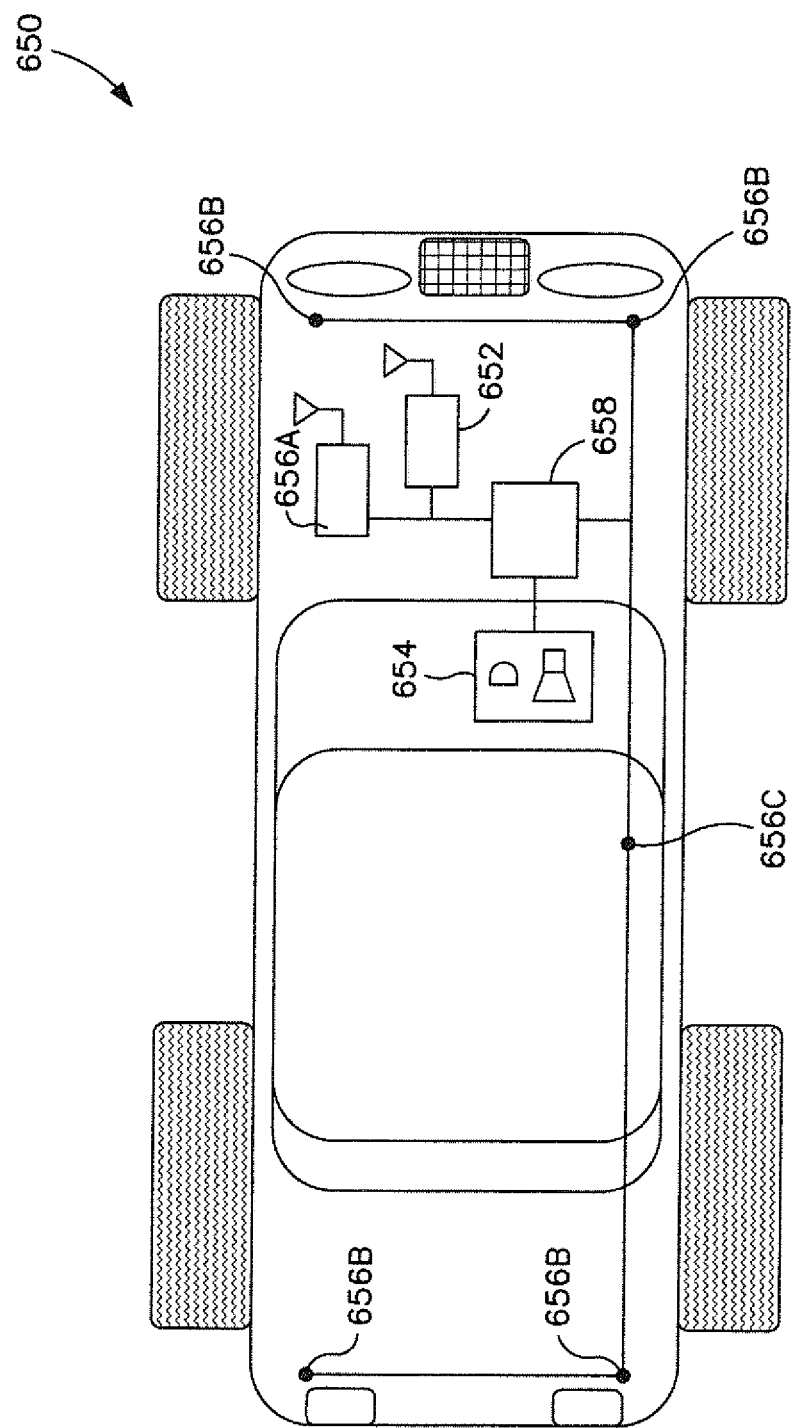
FIG. 6B is a block diagram illustrating one embodiment of an IVS apparatus disposed within a land vehicle (automobile) according to the present invention.

Referring now to FIG. 6b, exemplary client apparatus 650 according to the present invention is described. In the illustrated embodiment, the client apparatus includes an In-Vehicle System (IVS) 650, although it will be appreciated that other types of apparatus may be used with equal success.

The illustrated IVS apparatus 650 includes, inter alia, a housing, a radio 652 capable of at least transmitting and receiving data over a cellular network, a microphone and speaker assembly 654 for receiving voice communications from the occupants of the vehicle and playing out downstream or reverse communications, one or more sensors adapted to collect data regarding the vehicle status 656, and a processing device 658 which is capable of initiating a connection to the cellular network via the radio, and transmitting voice and data streams according to the methods and protocols described previously herein.

The apparatus 650 may also include a video or camera sub-system (not shown) which can collect image data and provide this data to the processing sub-system 658 for packetization and transmission over the network as another "real-time" stream akin to the voice transmissions previously described. Moreover, the voice and video streams can be temporally related so as to be played out in a coordinated fashion, such as by way of an ITU Standard H.323 or similar protocol well known to those of ordinary skill in the packetized data networking arts, which provides for synchronization of voice and video.

The control protocol and voice data interleaving functionality described above may be performed to varying degrees within the client as desired (or alternatively a dedicated or multi-function device in communication with the client). Such functionality is performed in software in the illustrated embodiment, although firmware/hardware embodiments are also envisioned. As used herein, the terms "software" and "computer program" may include without limitation any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

In one embodiment of the apparatus 650, the one or more sensors adapted to collecting data regarding the vehicle status additionally comprise: (i) a Global Positioning Service (GPS) receiver 656A, (ii) one or more accelerometers 656B positioned within the chassis to determine collision and/or chassis position, and (iii) sensors 656C for determining the occupancy of the vehicle. The GPS receiver provides a relatively precise location of the vehicle at any given time, while the accelerometers determine whether an impact or other event (e.g., roll-over accident) has occurred. Occupancy data can be used to, inter alia, determine whether the vehicle was occupied at the time of the event (thereby allowing for a change in priority if it was not occupied), and also the number of occupants (thereby allowing for, e.g., dispatch of a suitable number of emergency vehicles or service personnel). Other sensors may be used as well if desired, including for example a stress/strain sensor to detect deformation of various components of the vehicle, temperature and other environmental sensors to detect the condition of the vehicle environment (e.g., submerged in water, on fire, etc.), and so forth; these additional sensors may also provide input or payload data for any outgoing data transmissions.

The radio/modem 656A subsystem includes a digital baseband, analog baseband, RX frontend and TX frontend. The apparatus further includes an antenna assembly and duplex component; the duplexing component may include a simple switch for switching between antenna operations. The switch may also include a discrete component. While specific architecture is discussed, in some embodiments, some components may be obviated or may otherwise be merged with one another (such as RF RX and RF TX combined, as of the type used for 3G digital RFs) as would be appreciated by one of ordinary skill in the art given the present disclosure.

An user interface system 654 is optionally provided, and may comprise any number of well-known I/O including, without limitation: touch screen, LCD display, backlight, etc. It is recognized that in the IVS system, the system in general minimally provides means for generating a voice stream or other sound sampling of from the vehicle (i.e., a microphone), and a means for synthesizing an audible message (i.e. a speaker), so as to facilitate communication. It will be appreciated that in some cases, the I/O subsystem may be used merely for monitoring, such as in the event the occupants of the vehicle are rendered unconscious and cannot speak, or for passive monitoring by the network operator or law enforcement (such as where the vehicle is equipped with a "silent alarm" which the occupant can trigger when being carjacked, abducted, etc.).

The illustrated embodiment of the apparatus includes an application microprocessor subsystem 658 with one or more processors such as a digital signal processor, microprocessor/CPU, RISC core, field-programmable gate array, or plurality of processing components mounted on one or more substrates. The processing subsystem may also comprise an internal cache memory. The processing subsystem is in data communication with a memory subsystem comprising memory which may for example, comprise SRAM, flash, and SDRAM components. The memory subsystem may implement one or a more of DMA type hardware, so as to facilitate data accesses as is well known in the art.

In one exemplary apparatus, the IVS is adapted to utilize internal logic (e.g., via an algorithm stored in program memory) to initiate an eCall with the PSAP. Once the eCall is established, the IVS provides continuous voice or other payload traffic, interspersed with data read from the aforementioned sensors distributed throughout the vehicle. Control over voice (or payload) and the sensor data is provided by the processing subsystem.

In one such embodiment, the eCall is automatically initiated by one or more of the sensors 656 of the vehicle detecting a collision, such as where an accelerometer detects an acceleration value greater than a prescribed threshold (which would be indicative of a collision). Any number of other scenarios may be used to trigger such a call, including e.g., a rapid drop in ambient temperature (indicating submergence in a body of water), inversion of the vehicle (roll-over accident), rapid increase in temperature under the hood or in the interior (possible engine or other fire, or suffocation situation such as on a very hot day with the windows rolled up), lack of activity in the vehicle while engine running (potentially indicating that the driver has passed out due to e.g., medical or other condition), and so forth. In an alternative embodiment, the eCall is initiated by one of the occupants within the vehicle, such as where the vehicle requires towing assistance.

The radio modem subsystem initiates a cellular call, and establishes a transport layer for providing network messaging, as well as a real time communications link. Control over call handling may be performed either at the radio modem subsystem, or at the processing subsystem. Responsive to the radio modem subsystem initiating a cellular call, the network entities should provide preferential and expedited handling procedures as previously described.

Subsequent to establishment of the eCall, two or more streams are generated. At least one of these streams is a voice call stream generated by the user interface microphone assembly, the remaining stream(s) is/are generated by each of the monitored sensors for transmittal as a data stream, such as on an infrequent and or sporadic basis. The processing subsystem arbitrates the two streams to the radio/modem subsystem as previously described.

It will further be appreciated that while the exemplary embodiment of the client device 650 is described as having a GPS (or AGPS) receiver for position location, other techniques may be employed, whether in place of or in concert with the aforementioned GPS receiver. For example, the methods and apparatus for position location in a Single Frequency Network (SFN) such as for example a WiMAX network, described in co-owned and co-pending U.S. patent application Ser. No. 12/286,646 filed Sep. 30, 2008 and entitled "Methods and Apparatus for Resolving Wireless Signal Components", which is incorporated herein by reference in its entirety, may be used consistent with the invention to provide mobile client location data. Specifically, the aforementioned application discloses methods and apparatus enabling a wireless network to generate data that can be used by a receiver (e.g., UE) to resolve the contributions of individual transmitters, such as to determine its location without resort to external devices such as GPS satellites. In one embodiment, the wireless network includes a single frequency network (SFN), and a unique base station identifier is embedded within the data, and encoded in a manner which allows the UE to calculate path characteristics (such as path latency, and Direction of Arrival) to triangulate its position.

Moreover, since GPS sometimes cannot operate when the receiver is indoors or when shrouded or obscured by structures such as tunnels, overpasses, etc., the cellular-based location techniques can be used as a "back up" for GPS (or vice-versa), or the two techniques can be used in a confirmatory fashion for one another so as to ensure emergency services, etc. are sent to the correct location (assuming the vehicle operator cannot respond verbally, or they do not know exactly where they are located).

Extant cellular technology, even without the aforementioned GPS- or SFN-based techniques, are none-the-less capable of resolving at least which cell within the network that a mobile unit or UE is currently associated with. Hence, this information can be used as well either for determination of a location, or confirmation of another "fix" or estimated position provided by another system. For instance, if the IVS is equipped with a "submergence" sensor, and only the cell site or base station with which the IVS was last in communication is known, this information can be used by the PSAP/emergency operator to get a rough idea where the vehicle is (i.e., look for bodies of water within the coverage of that particular cell site). Such information (e.g., cell site ID or the like) can be readily included within the data sent to the PSAP using the techniques described herein (e.g., a "site association" field or the like.

Business Methods—

In another aspect of the invention, methods of doing business relating to the foregoing emergency call services within a packet switched network are disclosed.

In one embodiment, the radio/modem capabilities enabled by the invention can be marketed and leveraged for the benefit of the network operator, and/or third parties. For example, a device manufacturer or service provider can differentiate their product or service over others based on its ability to provide emergency call service within either or both PS and CS/PS type networks. The aforementioned IVS system capabilities can also be used as a basis of differentiation or to support a higher price; by giving consumers the assurance that their vehicle will be able to initiate an emergency call in the event of an accident, regardless of location and or service plan. Subscribers will ostensibly be willing to pay more either in terms of initial price or ongoing subscription fees for such capabilities.

In another aspect, the supplemental nature of real time packetized data service for emergency calls within an IVS enabled by the present invention can provide a greater flexibility in subscriber usage. Opportunities for portioning out various services may include optional services such as emergency door lock openings, silent transmitter (e.g., "lo-jack") tracking, emergency coordinates/directions, and any other variety of quasi-emergency service provided for the subscriber's convenience.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing an emergency call within a network configured for substantially real-time packet-switched operation, the emergency call comprising a composite stream having a first stream and one or more second streams, the method comprising:
   providing a digital representation of voice data using encoded voice packets within the first stream in a substantially continuous manner;
   providing data packets within the one or more second streams;
   forming the composite stream by interspersing the data packets of the one or more second streams with the first stream without modifying the digital representation of the voice data;
   establishing a session, wherein the session is additionally adapted to route the composite stream; and
   transmitting the composite stream via the session without modifying the digital representation of the voice data.

2. The method of claim 1, wherein the session comprises a real-time session established utilizing a session initiation protocol.

3. The method of claim 1, wherein the providing the first stream in a substantially continuous manner is comprised of substantially continuously encoding a voice signal to produce the voice packets.

4. The method of claim 1, wherein the providing the one or more second streams is performed in a substantially discontinuous or non-constant manner.

5. The method of claim 4, wherein the providing the one or more second streams in a substantially discontinuous manner comprises providing data from at least one source only periodically or intermittently.

6. The method of claim 5, wherein the data comprises location data, and the at least one source comprises a GPS receiver.

7. The method of claim 1, wherein the composite stream, the first stream and the one or more second streams are packetized.

8. The method of claim 7, wherein the act of forming comprises forming the composite stream by interspersing one or more packets of the first stream, with one or more packets of the second stream.

9. The method of claim 8, wherein the interspersing is performed using a multiplexing algorithm.

10. The method of claim 1, wherein the forming the composite stream using at least the first stream and the one or more second streams comprises: disposing at least portions of the first stream in a plurality of RTP packets; disposing at least portions of the one or more second streams in a plurality of RTCP packets; and interspersing the RTP packets with the RTCP packets.

11. The method of claim 1, wherein the network comprises a 3GPP IMS-compliant cellular network, and the session is established utilizing the Session Initiation Protocol (SIP).

12. A communication device, comprising:
   a processor; and
   a non-transitory computer readable storage medium that stores a set of instructions executable by the processor, wherein the set of instructions causes the processor to:
      provide a digital representation of voice data using encoded voice packets within the first stream in a substantially continuous manner;
      provide data packets within the one or more second streams;
      form the composite stream by interspersing the data packets of the one or more second streams with the first stream without modifying the digital representation of the voice data;
      establish a session, wherein the session is additionally adapted to route the composite stream; and
      transmit the composite stream via the session without modifying the digital representation of the voice data.

13. The communication device of claim 12, wherein the providing the first stream in a substantially continuous manner is comprised of substantially continuously encoding a voice signal to produce the voice packets.

14. The communication device of claim 12, wherein the providing the one or more second streams is performed in a substantially discontinuous or non-constant manner.

15. The communication device of claim 14, wherein the providing the one or more second streams in a substantially discontinuous manner comprises providing data from at least one source only periodically or intermittently.

16. The communication device of claim 12, wherein the composite stream, the first stream and the one or more second streams are packetized and wherein the act of forming comprises forming the composite stream by interspersing one or more packets of the first stream, with one or more packets of the second stream, wherein the interspersing is performed using a multiplexing algorithm.

17. A non-transitory computer readable storage medium having an executable program stored thereon, wherein the executable program instructs a processor to perform operations, comprising:
   providing a digital representation of voice data using encoded voice packets within the first stream in a substantially continuous manner;
   providing data packets within the one or more second streams;
   forming the composite stream by interspersing the data packets of the one or more second streams with the first stream without modifying the digital representation of the voice data;
   establishing a session, wherein the session is additionally adapted to route the composite stream; and transmitting the composite stream via the session without modifying the digital representation of the voice data.

* * * * *